United States Patent [19]
Sugiura et al.

[11] Patent Number: 5,621,451
[45] Date of Patent: Apr. 15, 1997

[54] IMAGE FORMING APPARATUS

[75] Inventors: Yoshinori Sugiura, Kawasaki; Noriyoshi Ishikawa; Takeshi Setoriyama, both of Yokohama; Chitose Tenpaku, Kawasaki; Tatsuo Hamada, Tokyo; Yoshiro Tsuchiya, Yokohama; Takeshi Kubota, Tama; Ken Murooka, Tokyo; Takeshi Niimura, Musashino; Nobukazu Adachi, Yokohama; Akira Kuroda, Yokohama; Takeshi Sugita, Yokohama; Akira Yuza, Yokohama; Jun Azuma, Kawasaki, all of Japan

[73] Assignee: Canon Kabushiki Kaisha, Tokyo, Japan

[21] Appl. No.: 988,913

[22] PCT Filed: Jan. 18, 1993

[86] PCT No.: PCT/JP93/00054

§ 371 Date: Mar. 11, 1993

§ 102(e) Date: Mar. 11, 1993

[87] PCT Pub. No.: WO94/15792

PCT Pub. Date: Jul. 21, 1994

[51] Int. Cl.$^6$ .................................................. G03G 15/00
[52] U.S. Cl. .......................... 347/112; 347/129; 347/224; 399/1; 399/111; 399/154
[58] Field of Search ............................... 355/210, 210 A, 355/200, 285, 211; 346/108, 76 L; 347/112, 129, 224, 225

[56] References Cited

U.S. PATENT DOCUMENTS

| | | | |
|---|---|---|---|
| 4,873,548 | 10/1989 | Kobayashi et al. | 355/200 |
| 4,915,465 | 4/1990 | Sugiura | 350/6.5 |
| 5,047,803 | 9/1991 | Kanoto | 355/211 |
| 5,051,784 | 9/1991 | Yamamoto et al. | 355/285 |
| 5,056,768 | 10/1991 | Koyama | 271/3 |
| 5,126,788 | 6/1992 | Koga | 355/200 |
| 5,157,416 | 10/1992 | Kinoshita et al. | 346/108 |
| 5,191,359 | 3/1993 | Tsuzuki et al. | 346/108 |
| 5,225,881 | 7/1993 | Goto et al. | 355/319 |
| 5,231,453 | 7/1993 | Nakai et al. | 355/210 |
| 5,280,331 | 1/1994 | Namaki | 355/318 |
| 5,294,106 | 3/1994 | Takagi et al. | 271/164 |
| 5,319,470 | 6/1994 | Shukunami | 358/451 |
| 5,359,400 | 10/1994 | Itoh et al. | 355/285 |

FOREIGN PATENT DOCUMENTS

| | | | |
|---|---|---|---|
| 0255713 | 2/1988 | European Pat. Off. | |
| 487040 | 5/1992 | European Pat. Off. | 355/210 A |
| 61-279871 | 12/1986 | Japan. | |
| 1222269 | 9/1989 | Japan. | |

*Primary Examiner*—R. L. Moses
*Attorney, Agent, or Firm*—Fitzpatrick, Cella, Harper & Scinto

[57] ABSTRACT

An image forming apparatus for performing a recording operation with respect to a recording medium, includes an image forming device for forming an image on a recording medium, a recording medium receiver for receiving the recording medium on which the image is formed, and a laser beam emitter, arranged below the recording medium receiver, for emitting a laser beam in accordance with image information so as to cause the image forming device to form an image. The laser beam emitter is arranged below the recording medium receiver to emit a laser beam obliquely upward.

122 Claims, 10 Drawing Sheets

IMAGE FORMING APPARATUS

TECHNICAL FIELD

The present invention relates to an image forming apparatus for recording an image on a recording medium.

fin this case, as image forming apparatuses, an electrophotographic copying machine, a laser beam printer (LBP), an LED printer, a facsimile apparatus, a wordprocessor, and the like are included.

BACKGROUND ART

The background art of the present invention will be described below.

In recent years, a demand has arisen for a smaller image forming apparatus with improved operability. In order to satisfy such a demand on the market, the applicant of the present invention has previously made effective inventions, and disclosed them in Japanese Patent Application No. 60-123060 (Japanese Patent Application Laid-Open No. 61-279871; corresponding U.S. Pat. No. 4,873,548) and Japanese Patent Application No. 63-047637 (Japanese Patent Application Laid-Open No. 01-222269; corresponding U.S. Pat. No. 5,047,803).

The present invention has been made by improving the previous inventions. According to the present invention, there is provided an image forming apparatus which realizes a further reduction in size and an improvement in operability.

SUMMARY OF THE INVENTION

It is an object of the present invention to provide an image forming apparatus which realizes a further reduction in size.

It is another object of the present invention to provide an image forming apparatus which can be installed in a small installation space.

It is still another object of the present invention to provide an image forming apparatus which realizes an improvement in operability.

It is still another object of the present invention to provide an image forming apparatus in which a sufficiently large number of recording media on which images have been formed can be stacked in spite of a reduction in size.

It is still another object of the present invention to provide an image forming apparatus which realizes a low-profile structure by reducing the height of the apparatus.

According to one main aspect of the present invention, there is provided an image forming apparatus for performing a recording operation with respect to a recording medium, comprising image forming means for forming an image on a recording medium, recording medium receiving means for receiving the recording medium on which the image is formed by the image forming means, and laser beam emitting means, arranged below the recording medium receiving means, for emitting a laser beam in accordance with image information so as to cause the image forming means to form an image. Wherein the laser beam emitting means arranged below the recording medium receiving means emits a laser beam obliquely upward.

According to another main aspect of the present invention, there is provided an image forming apparatus which allows a process cartridge to be mounted therein and forms an image on a recording medium, comprising mounting means for allowing the process cartridge to be mounted therein, the process cartridge having an image bearing member and process means acting on the image bearing member, fixing means for fixing the image on the recording medium, and laser beam emitting means, arranged between the process cartridge mounted in the mounting means and the fixing means, for emitting a laser beam in accordance with image information.

According to still another main aspect of the present invention, there is provided an image forming apparatus which allows a process cartridge to be mounted therein and forms an image on a recording medium, comprising mounting means for allowing the process cartridge to be mounted therein, the process cartridge having an image bearing member and process means acting on the image bearing member, transfer means for transferring a toner image, formed on the image bearing member included in the process cartridge mounted in the mounting means, onto the recording medium, fixing means for fixing the image, transferred onto the recording medium by the transfer means, on the recording medium, laser beam emitting means, arranged between the process cartridge mounted in the mounting means and the fixing means to be located within a height of the process cartridge mounted in the mounting means in a vertical direction, for emitting a laser beam in accordance with image information, a feed cassette, arranged below the apparatus, for storing the recording medium, recording medium receiving means for receiving a recording medium on which an image has been formed, and convey means for guiding a recording medium fed from the feed cassette to a position between the image bearing member and the transfer means upon reversing the recording medium, and guiding the recording medium, on which a toner image has been transferred from the image bearing member and which has passed through the fixing means, to the recording medium receiving means upon reversing the recording medium again.

According to still another main aspect of the present invention, there is provided an image forming apparatus which allows a process cartridge to be mounted therein and forms an image on a recording medium, comprising mounting means for allowing the process cartridge to be mounted therein, the process cartridge having an image bearing member and process means acting on the image bearing member, laser beam emitting means for emitting a laser beam on the image bearing member included in the process cartridge mounted in the mounting means in accordance with image information, and fixing means for fixing an image on the recording medium. Wherein the respective means are arranged in the order named in a horizontal direction. According to still another main aspect of the present invention, there is provided an image forming apparatus which allows a process cartridge to be mounted therein and forms an image on a recording medium, comprising mounting means capable of mounting a process cartridge between a mounting unit for a feed cassette and a stacking unit for a recording medium, which has undergone recording processing, in a vertical direction, the process cartridge having an image bearing member and process means acting on the image bearing member, fixing means for fixing an image on the recording medium, and convey means for reversing a recording medium fed from the feed cassette, and conveying the recording medium to cause the recording medium to be stacked on the stacking unit after a toner image is transferred from the image bearing member included in the process cartridge onto the recording medium, the toner image is fixed on the recording medium by the fixing means, and the recording medium is reversed.

With the above-described characteristic arrangement, the present invention realizes a further reduction in size of an image forming apparatus.

In addition, according to the present invention, with the above-described characteristic arrangement, a further improvement in operability is realized.

BEST MODE OF CARRYING OUT THE INVENTION

An image forming apparatus according to an embodiment of the present invention will be described below with reference to the accompanying drawings.

Figure 1:
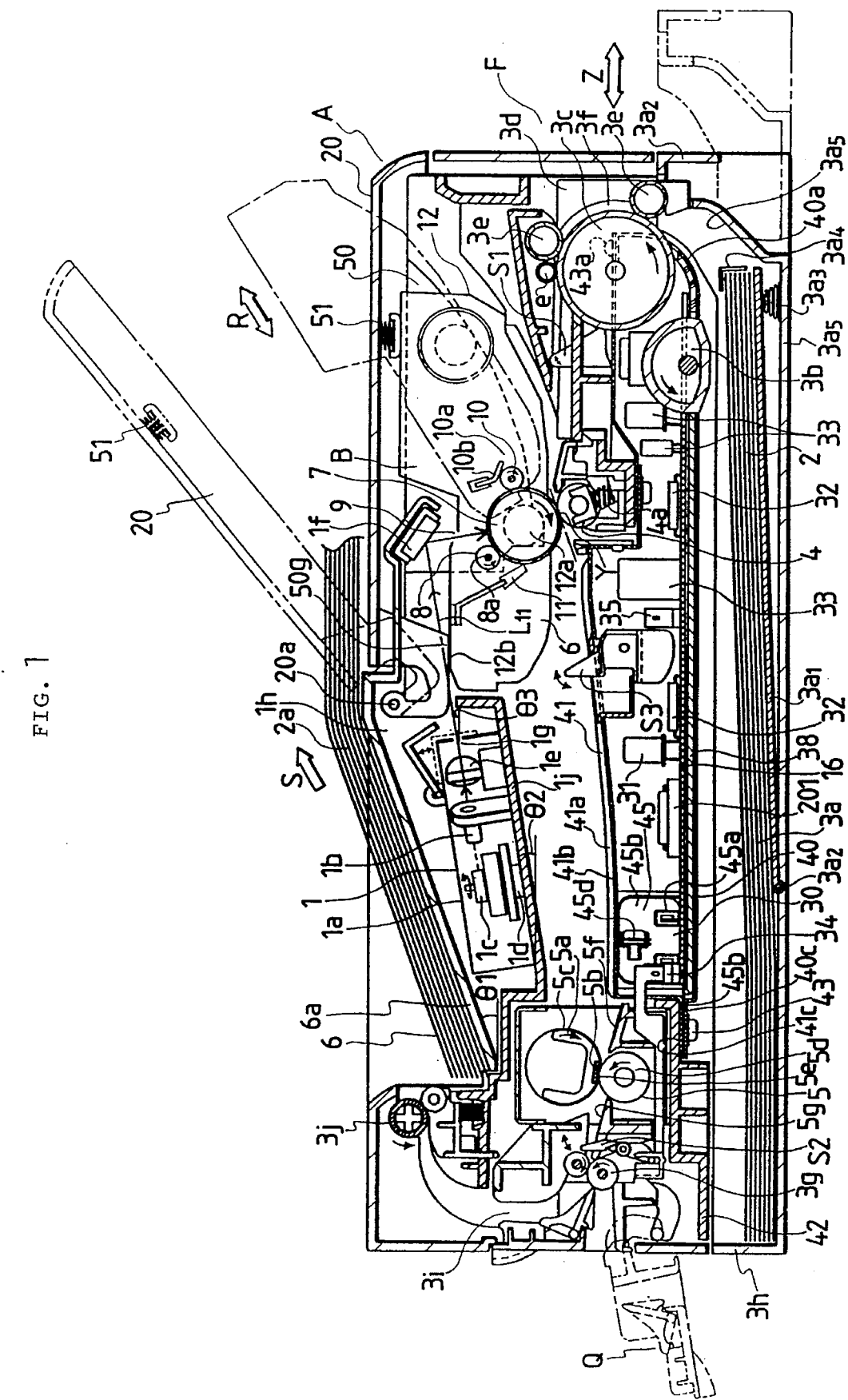
FIG. 1 is a sectional side view of a laser beam printer to which an embodiment of the present invention is applied.

FIG. 1 is a sectional side view of a laser beam printer as an image forming apparatus to which the present invention is applied.

The overall arrangement of the laser beam printer having a process cartridge mounted therein will be described first.

In this printer apparatus A, an optical image based on image information is radiated from an optical system 1 to form a toner image on a photosensitive drum as an image bearing member, as shown in FIG. 1. A recording medium 2 is conveyed upward by a feed roller 3b as a convey system in synchronism with the formation of the toner image. In an image forming unit as a process cartridge B, the toner image formed on the photosensitive drum 7 is transferred onto the recording medium 2 by a transfer means 4. Thereafter, the recording medium 2 is conveyed to a fixing means 5 to fix the toner image on the recording medium 2. The recording medium 2 is then discharged onto an upper stacking unit 6. In this case, as shown in FIG. 1, a recording medium 2a discharged from the apparatus main body is stacked on the upper stacking unit 6 such that a leading end portion of the medium is laid horizontally while its trailing end portion is inclined.

As shown in FIG. 1, in the process cartridge B constituting the image forming unit, the photosensitive drum 7 is rotated to uniformly charge its surface by using a charging roller 8 as a charging means, and an optical image from the optical system 1 is radiated on the photosensitive drum 7 through an exposure opening 9 formed in a cartridge frame 12, thus forming a latent image. Thereafter, a toner image corresponding to the latent image is formed by a developing sleeve 10 of a developing means to visualize the latent image. After the toner image is transferred on the recording medium 2 by the transfer means 4, the residual toner on the surface of the photosensitive drum 7 is removed by a cleaning plate 11 of a cleaning means. Note that the respective components such as the photosensitive drum 7 are stored, as cartridges, in the cartridge frame 12 constituting the housing.

The arrangements of the respective components of the printer apparatus A and the process cartridge B will be described next.

Image Forming Apparatus

The arrangements of the respective components of the printer apparatus A will be described. More specifically, the optical system, a convey system, the transfer means, the fixing means, an electric equipment unit, an electric equipment unit cover which also serves as a guide, a cartridge mounting means, and the overall arrangement of the apparatus will be described below in the order named.

Optical System

Figure 2:
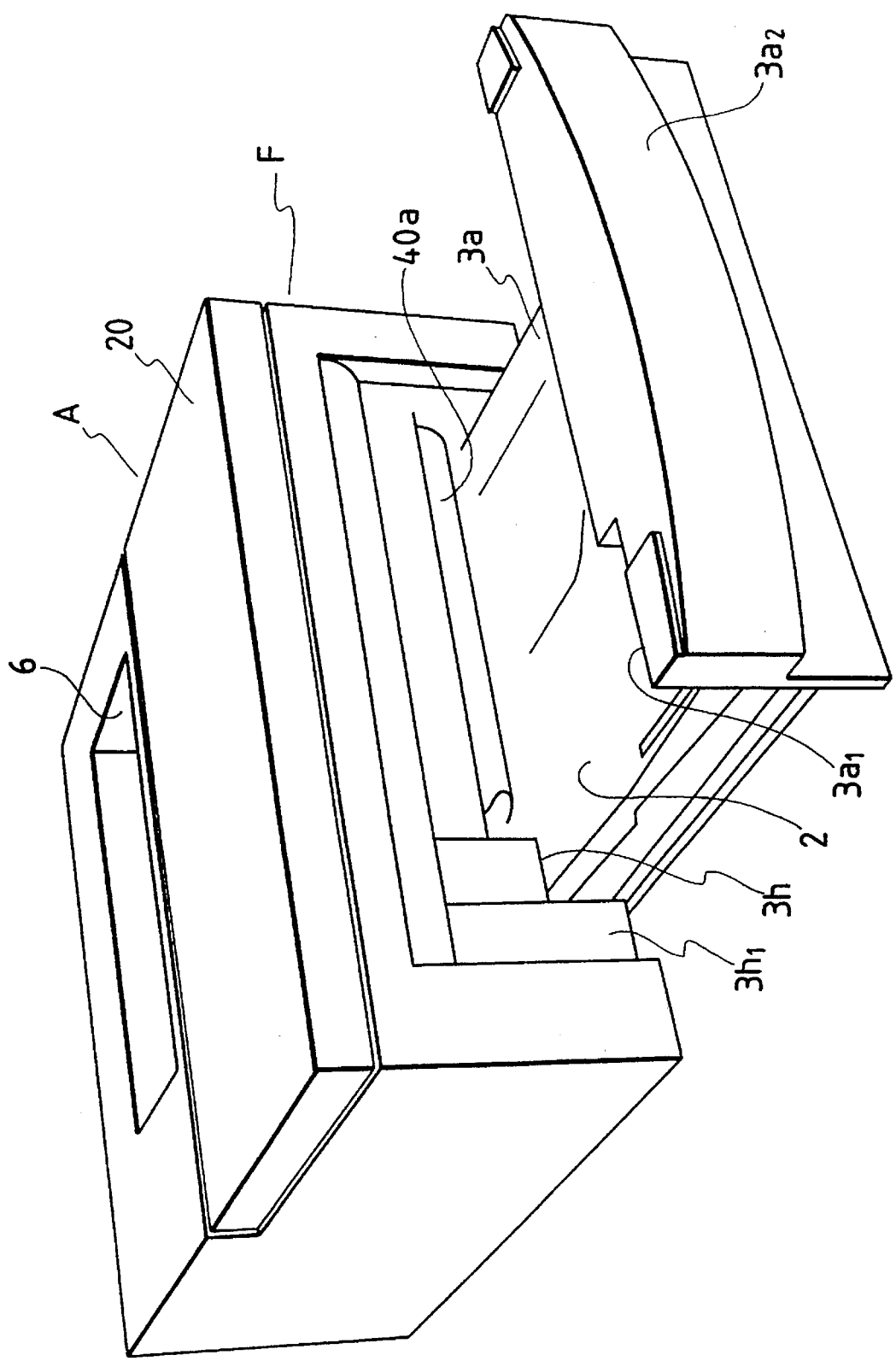
FIG. 2 is a perspective view showing the outer appearance of the laser beam printer in FIG. 1.
Figure 3:
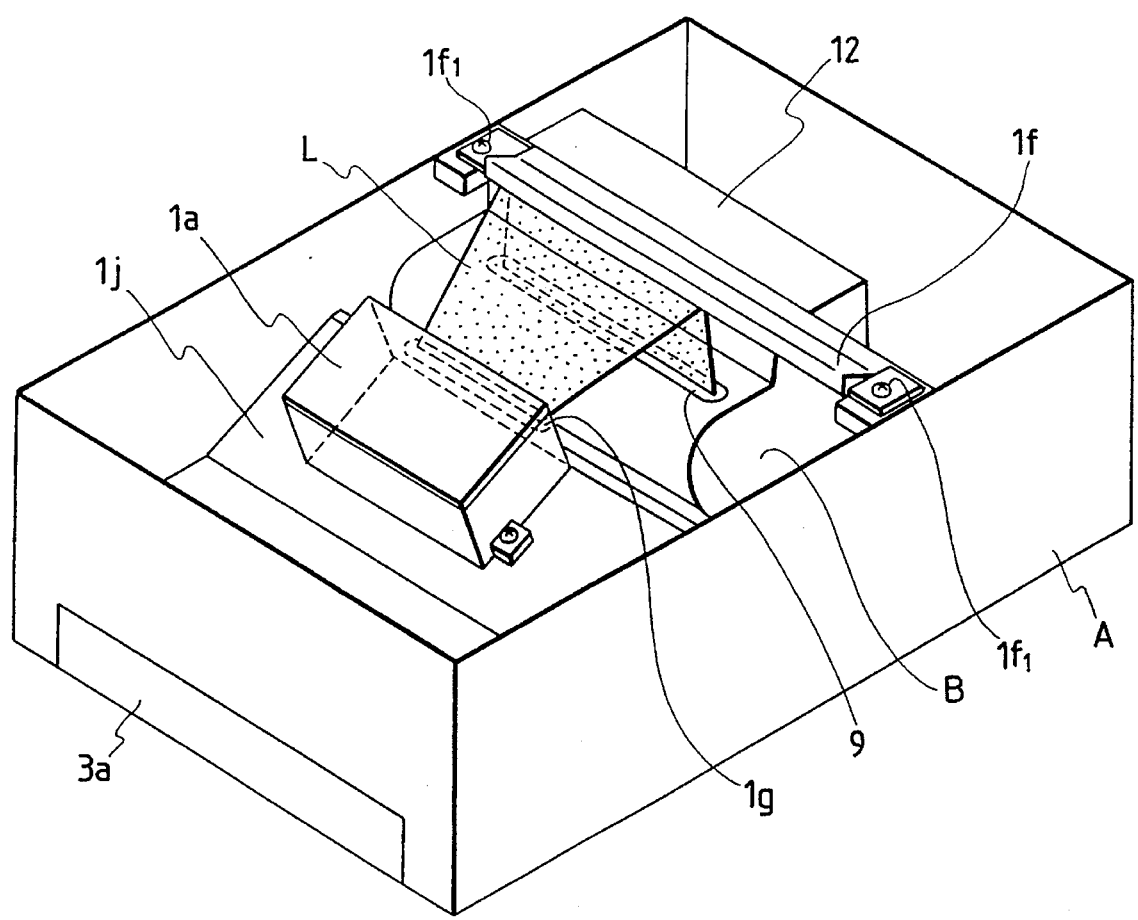
FIG. 3 is a perspective view showing the interior of the laser beam printer in FIG. 1.

The optical system will be described below with reference to FIGS. 1 to 3. FIG. 3 is a perspective view showing the interior of the apparatus main body.

The optical system 1 radiates an optical image on the photosensitive drum 7 by radiating light on the basis of image information read from an external unit or the like. As shown in FIG. 1, a laser scanner unit 1a of the apparatus main body A houses a laser diode 1b, a polygon mirror 1c, a scanner motor 1d, and an imaging lens 1e. Note that the laser scanner unit 1a is arranged within the height of the process cartridge B mounted in the apparatus main body.

Upon reception of an image signal from an external unit (host unit), e.g., a computer or a wordprocessor, the laser diode 1b emits light in accordance with the image signal, and radiates the light, as image light, on the polygon mirror 1c. The polygon mirror 1c is rotated at high speed by the scanner motor 1d. The image light reflected by the polygon mirror 1c is radiated on the rotating photosensitive drum 7 through the imaging lens 1e and a reflecting mirror 1f. As a result, the surface of the drum 7 is selectively exposed, and a latent image corresponding to the image information is formed thereon. In this case, the reflecting mirror 1f is fixed to the apparatus main body at a predetermined angle with a screw 1f1.

Reference numeral 1g denotes a unit opening through which light passing through the imaging lens 1e emerges from the unit toward the reflecting mirror 1f. In this case, the unit opening 1g is formed such that light emerging therefrom obliquely propagates upward. Reference numeral 1h denotes a laser shutter capable of opening/closing the unit opening 1g. The laser shutter 1h opens/closes the opening 1g upon interlocking with a mounting/dismounting operation of the process cartridge to be described later so as to prevent a laser beam L from unintentionally emerging outside the unit while the process cartridge is not mounted (the shutter 1h indicated by the solid line is in an open state, and the shutter 1h indicated by the broken line is in a closed state). A detailed description of the opening/closing mechanism of the shutter 1h will be omitted.

In this embodiment, the laser scanner unit 1a is mounted on a support plate 1j to be inclined upward so that the laser beam L can be emitted upward obliquely. More specifically, the laser scanner unit 1a is inclined upward in the same direction as an upwardly inclined stacking surface 6a of the stacking unit 6 arranged on the upper surface of the apparatus main body A. The laser scanner unit 1a substantially extends along the stacking surface 6a. Even if, therefore, the height of the apparatus main body A is minimized, since the inclination angle of the stacking surface 6a of the upper stacking unit 6 can be increased, a sufficient number of recording media can be stacked.

The inclination angle (θ1) of the stacking surface 6a with respect to the horizontal direction is preferably set to be about 15° to 45°, and more preferably about 20° to 40°, in consideration of the discharging performance. In the embodiment, the inclination angle was set to be about 20°. In addition, the inclination angle (θ2) of the laser scanner unit 1a with respect to the horizontal direction was set to be about 9° to 12.5°. Therefore, the emission angle (θ3) of the laser beam L with respect to the horizontal direction is about 9° to 12.5°. With this arrangement, about 50 to 100 recording sheets can be stacked on the upper stacking unit 6.

In the embodiment, the outer size of the laser beam printer for recording an image on a recording medium of a A4 size (210 mm×297 mm) could be reduced to the following ranges:

① height: about 130 mm to 145 mm

② depth: about 350 mm to 370 mm

③ width: about 350 mm to 360 mm

Recording Medium Convey System

The arrangement of a convey system 3 for conveying the recording medium 2 (e.g., a recording sheet, an OHP sheet (plastic sheet), a cloth, or a thin plate) will be described next. As shown in FIGS. 1 and 2, the convey system 3 of the embodiment has a mounting portion 3h of a cassette 3a on the bottom portion of the apparatus main body A. In this case, the cassette 3a is arranged on almost the entire bottom surface of the apparatus main body A. The cassette 3a can be inserted/withdrawn in/from the mounting portion 3h in the direction indicated by an arrow Z from a front surface F side. Note that positioning of the cassette 3a with respect to the mounting portion 3h is performed by bringing a cassette-side abutment portion 3a1 into contact with a main-body-side abutment portion 3h1. The recording media 2 stored in the cassette 3a are fed therefrom one by one, starting from the uppermost recording medium, by a pickup roller 3b. A reverse roller is then rotated, in accordance with an image forming operation, to convey the recording medium 2 to a transfer region Y of the image forming unit. After the image forming operation, the recording medium 2 is further conveyed to the fixing means 5. The recording medium 2 is then discharged onto the upper stacking unit 6 by a discharging roller pair 3j. In this case, a roller 3e is rotated upon rotation of a reverse roller 3c. Note that reference numeral 3a2 denotes a cassette grip.

The above arrangement will be described in more detail below.

In response to a print start signal, a driving force is transmitted to a one-direction control clutch (not shown) to rotate the pickup roller 3b once. As a result, one of the recording media 2 in the cassette 3a is fed in the forward direction of the cassette 3a (the forward direction of the apparatus main body A). The fed recording medium 2 is conveyed to a rear position in the apparatus main body A through a first reverse sheet path 3f constituted by the reverse roller 3c, a guide 3d, the roller 3e, and the like, while the recording medium 2 is reversed through 180°. The recording medium 2 is guided to a tight contact nip portion Y (transfer region) between the photosensitive drum 7 and the transfer means 4, and the toner image formed on the surface of the drum 7 is transferred onto the recording medium 2. The recording medium 2 on which the toner image is transferred is guided by a cover 41 (to be described later) to reach the fixing means 5. When passing through the fixing means 5, the toner image is fixed on the recording medium 2 by heat and pressure. Upon passing through the fixing means 5, the recording medium 2 reaches a curved second reverse sheet path 3i through a relay convey roller pair 3g. When passing through the second reverse sheet path 3i, the recording medium 2 is reversed through 180° again and is discharged onto the upper stacking unit 6 by the discharging roller pair 3j.

In the printer apparatus of the embodiment, the recording medium 2 fed once from the cassette 3a, arranged on the bottom portion of the apparatus, toward the front portion of the apparatus is reversed when passing through the first reverse sheet path 3f, and is moved toward the rear portion of the apparatus. In the process of moving toward the rear portion of the apparatus, the recording medium 2 undergoes toner image transfer processing in the transfer region Y. Thereafter, the toner image is fixed on the recording medium 2 by the fixing means 5. After the fixing operation, the recording medium 2 is reversed again through the second reverse sheet path 3i and is moved toward the front portion of the apparatus. The recording medium 2 is then discharged onto the upper stacking unit 6 on the upper portion of the apparatus. That is, in the embodiment, the convey path for recording media has a letter of "S" shape.

According to the embodiment, therefore, the space for installing the apparatus can be further reduced. Moreover, the recording media 2 which have undergone image recording processing are sequentially stacked on the upper stacking unit 6 with the image-formed surfaces facing down.

Note that the cassette 3a can be manually withdrawn/ inserted from/in the mounting portion 6 (in the direction indicated by the arrow Z in FIG. 1) by the operator at the front side of the apparatus, and replenishment of the recording media 2 is performed while the cassette 3a is withdrawn from the mounting portion 6. The cassette 3a will be described here. Reference numeral 3a1 denotes a stacked matter which can be pivoted about a shaft 3a2; 3a3, a push-up spring for pushing a stacking plate 2 upward; 3a4, a separation pawl for separating the recording media 2 one by one when they are fed; and 3a5, a guide for guiding the leading end of the fed recording medium 2 to the position between the reverse roller 3c and the roller 3e. The stacking plate 3a1, the push-up spring 3a3, the separation pawl, the guide 3a5, and the like are disposed in a cassette box 3a5, and hence can be withdrawn together as the cassette 3a.

Sensors S1, S2, and S3 arranged in the convey path for the recording medium 2 will be described below.

The sensor S1 is a registration sensor, which detects the leading end of the recording medium 2 fed from the cassette 3a to the transfer region Y to regulate the laser write timing of the laser scanner unit 1a, and also detects the presence/ absence of a residual recording medium at the start time of the apparatus main body.

The sensor S2 is a discharge sensor (a detecting member on the rear side of the fixing unit), which detects the arrival of the leading end and the departure (passage) of the trailing end of the recording medium 2 which has passed through the fixing means 5, and also detects the presence/absence of a residual recording medium at the start time of the apparatus.

The sensor S3 is a sensor (a detecting member on the front side of the fixing unit) arranged in the sheet path extending from the transfer region Y to the fixing means 5 to detect the presence/absence of a recording medium.

With this arrangement, when a jam occurs in the apparatus, a control unit 200 detects the jam in accordance with the feed timing and the relationship between signals from the sensors S1 and S2, thus bringing the apparatus main body to an emergency stop. In addition, the occurrence of the jam is displayed.

Assume that the recording medium 2 is jammed in the fixing unit 5. In this case, the arrival of the leading end of the recording medium is not detected by the discharge sensor S2 in spite of the fact that the time required for the leading end of the recording medium to arrive at the discharge sensor S2 as the detecting member on the rear side of the fixing unit has elapsed since time counting is started from the feed timing. Therefore, the control unit 200 determines that the recording medium is jammed in the fixing unit 5 in a wound state, and brings the apparatus to an emergency stop. Note that the jammed recording medium is removed upon opening the rear portion of the apparatus main body A (indicated by a broken line Q in FIG. 1).

Transfer Means

The transfer means 4 transfers a toner image, formed on the photosensitive drum 7 in the image forming unit, onto the recording medium 2. As shown in FIG. 1, the transfer means 4 of the embodiment is constituted by a transfer roller 4. More specifically, the recording medium 2 is pressed against the photosensitive drum 7 of the process cartridge B by the transfer roller 4, and a voltage having a polarity opposite to that of the toner image formed on the photosensitive drum 7 is applied to the transfer roller 4, thus transferring the toner image, formed on the photosensitive drum 7, onto the recording medium 2. Reference numeral 4a denotes a spring for pressing the transfer roller 4 against the photosensitive drum 7.

Fixing Means

The fixing means 5 fixes the toner image, transferred onto the recording medium 2 by applying the voltage to the transfer roller 4, on the recording medium 2. FIG. 1 shows the arrangement of the fixing means 5. More specifically, reference numeral 5a denotes a heat-resistant film guide member having a substantially semicircular trough-like cross-section; 5b, a flat ceramic heater (heating member) disposed on the middle portion of the lower surface of the film guide member 5b to extend along its longitudinal direction; 5c, a cylindrical (endless) thin film (fixing film) consisting of a heat-resistant resin, which is loosely fitted on the film guide portion 5a having the ceramic heater; and 5d, a pressure roller which is arranged below the film guide portion 5a and is always biased upward by a push-up spring (not shown) to be pressed against the ceramic heater 5b through the film 5c. That is, the ceramic heater 5b and the pressure roller 5d are pressed against each other through the film 5c to constitute a fixing nip portion 5e.

The ceramic heater 5b is energized by an energization system to generate heat, and is controlled by a temperature control system of the control unit 200 (FIG. 7) (to be described later) to a predetermined fixing temperature.

The pressure roller 5d is rotated at a predetermined peripheral speed in the counterclockwise direction indicated by the arrow. Owing to a frictional force generated upon rotation of the pressure roller 5d, the cylindrical film 5c is rotated around the outer surface of the film guide portion 5a at a predetermined peripheral speed in the clockwise direction indicated by the arrow while the film 5c is in tight contact with the lower surface of the ceramic heater 5b at the fixing nip portion 5e and is slidably moved along the heater surface.

The recording medium 2 which has undergone image transfer processing and is conveyed to the fixing unit 5 is guided to an inlet guide 5f and is inserted between the cylindrical film 5c and the pressure roller 5d which are being rotated at the fixing nip portion 5e between the temperature-controlled ceramic heater 5b and the pressure roller 5d. The recording medium 2 then comes into tight contact with the lower surface of the ceramic heater 5b through the film 5c and passes through the fixing nip portion 5e together with the film 5c in an overlapped state.

In the process of passing through the fixing nip portion 5e, the non-fixed toner image on the recording medium 2 is heated upon receiving the heat from the ceramic heater 5b through the film filter 5c, thus fixing the image on the recording medium 2.

The recording medium 2 which has passed through the fixing nip portion 5e is separated from the surface of the film 5c which is being rotated, and is guided to the convey roller pair 3g by an outlet guide 5g.

Electric Equipment Unit

Figure 4:
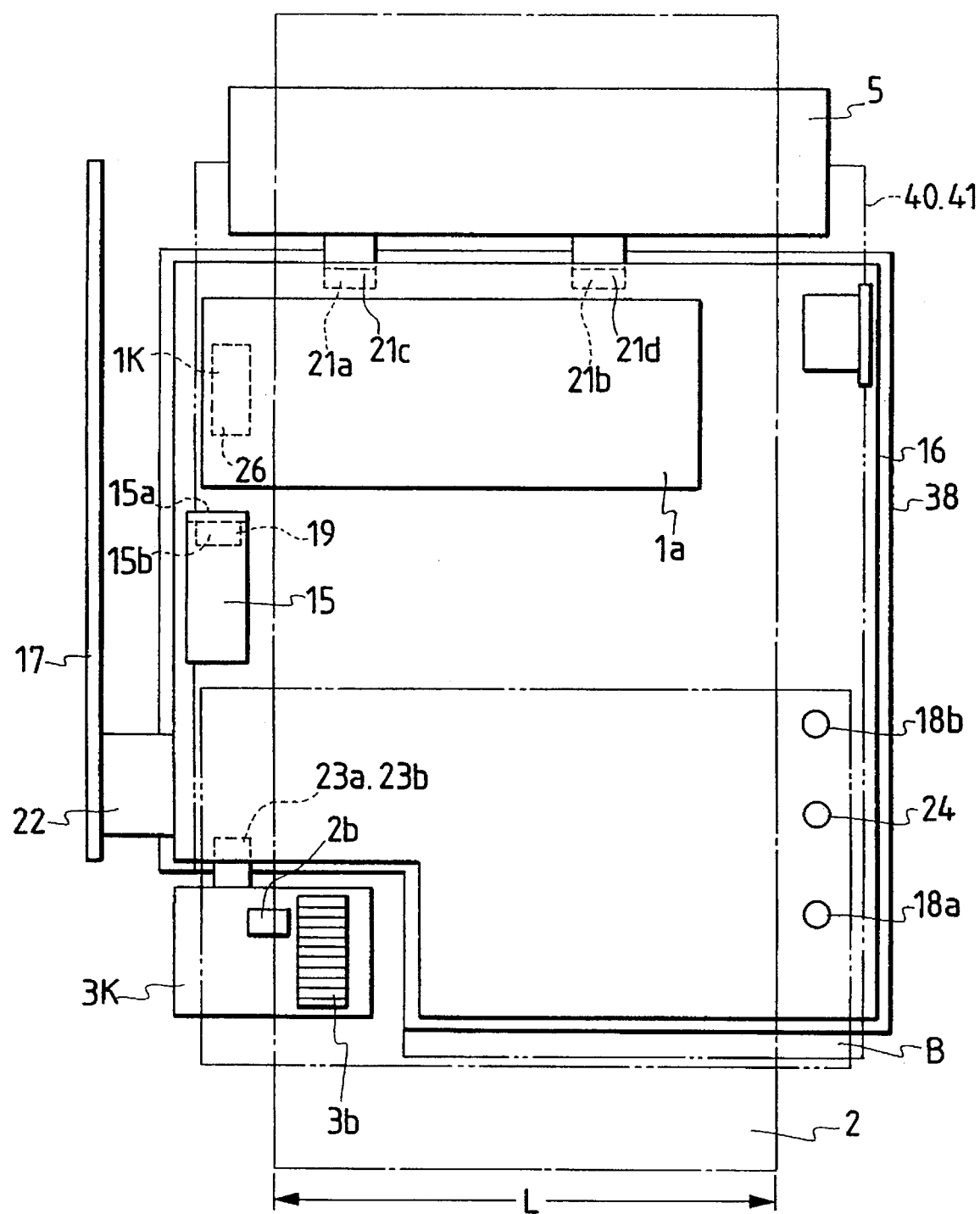
FIG. 4 is a plan view of a portion near a composite electric circuit board.

The electric equipment unit will be described below with reference to FIGS. 1, 4, and 7. FIG. 4 is a plan view of a portion near an electric circuit board 16, in which an insulating sheet 38 is indicated by the solid line, and upper and lower covers 40 and 41 are indicated by alternate long and two short dashed lines.

In the embodiment, all electric parts such as an AC input unit, a DC power supply unit, a high-voltage power supply unit, a control circuit unit, switches, sensors, and connectors are mounted on one printed board. More specifically, the following electric parts are mounted on one printed board, i.e., the electric circuit board 16, at a high density: an AC input unit 401 for receiving AC power from an external commercial power supply 400 and removing noise; a DC power supply unit 402 for converting the AC power into DC power of 5 or 24 V; a high-voltage power supply unit 403 for supplying power to the process cartridge B (the developing means 10 and the charging roller 8) and the transfer roller 4; and the controller unit 200 such as a CPU for controlling the overall operation of the image forming apparatus. Reference numeral 17 denotes an image processing circuit board for performing image processing for a character, a symbol, or the like in accordance with a print signal from a host computer. The image processing circuit board 17 is arranged to be perpendicular to the electric circuit board 16.

A method of electrically connecting the electric circuit board 16 to other main units will be described next.

A feed unit 3k is connected to the electric circuit board 16 such that contact electrodes 23a and 23b, each consisting of a material such as phosphor bronze or SUS are brought into contact with electrode portions 23c and 23d on the electric circuit board 16. Upon electrical connection between the feed unit 3k and the electric circuit board 16, ON/OFF control of a solenoid 3m arranged on the feed unit 3k is performed. The solenoid 3m is ON/OFF-controlled to drive/stop the pickup roller 3b.

Both the process cartridge B and the transfer roller 4 are electrically connected to the electric circuit board through contact springs 18a, 18b, and 24, each consisting of a material such as SUS and protruding upward from a portion, of the electric circuit board 16, which is located outside a width L (FIG. 4) of the maximum recording medium. With this electrical connection, the process cartridge B and the transfer roller 4 receive power or grounded. As shown in FIG. 4, since the contact springs 18a, 18b, and 24 are disposed outside the width of a recording medium of the maximum size, they do not interfere with the conveyance of recording media. In addition, as shown in FIG. 1, since the laser scanner unit 1a is disposed across the convey path for recording media, the effective use of the space can be realized. The spring 18a serves to apply a developing bias to the developing means 10. The spring 24 serves to ground the photosensitive drum 7. The spring 18b serves to apply a voltage to the charging roller 8 to perform a primary charging operation.

A driving motor 15 is electrically connected to the electric circuit board 16 such that a connector 15b on a motor board 15a disposed on a side surface of the driving motor 15 and a connector 19 on the electric circuit board 16 are fitted to each other.

The image processing circuit board 17 is electrically connected to the electric circuit board 16 at a side of the circuit board 16 such that a connector 22 fixed to the circuit board 17 is connected to a connector 22a fixed to the circuit board 16. The image processing circuit board 17 communicates with the control unit 200 (CPU 201) in the electric circuit board 16.

In addition, the fixing unit 5 is connected to the electric circuit board 16 below the convey path for recording media such that an AC connector 21a and a DC connector 21b, both fixed to the fixing unit 5, are connected to an AC connector 21c and a DC connector 21d, both fixed to the electric circuit board 16. With this electrical connection, the fixing unit 5 receives power and is controlled.

As described above, the main units in the image forming apparatus can be directly and easily connected to the electric circuit board 16 without using relays such as harnesses. With this arrangement, the number of components can be reduced by omitting harnesses and the like, and the operability in assembly and maintenance can also be improved. Furthermore, since a connection error and the like can be prevented, the reliability of the image forming apparatus can be improved.

As shown in FIG. 4, the laser scanner unit 1a is also connected to the electric equipment unit 16 at a position outside the width of the convey path for recording media such that a connector 5b on the relay board 1k side and a connector 26 on an electric equipment board 16a are connected to each other. As described above, according to the embodiment, all the units, in the image forming apparatus, which require electrical control can be connected to the electric circuit board 16. That is, the electrical control functions required for the image forming apparatus can be concentrated on the electric circuit board 16. Therefore, by intensively managing the quality of the electric circuit board 16, the quality of the image forming apparatus can be guaranteed.

Of all the electric parts mounted on the electric circuit board 16, FIG. 1 shows an AC inlet 30, the CPU 201, a quartz member 31, various resistors 32, various capacitors 33, the photointerrupter of the sensor 82, and a photointerrupter 35 of the sensor S3.

Electric Circuit Board Cover Serving as Guide

The electric circuit board cover and its function as a convey guide for recording media will be described below with reference to FIG. 1.

As shown in FIG. 1, in the embodiment, the composite electric circuit board 16 is located above the feed cassette 3b and is arranged horizontally below the laser scanner unit 1a and the process cartridge B. The lower surface of the board 16 is covered with a lower cover 40 consisting of a material with a high conductivity, e.g., a steel plate with an aluminum coat, through an insulating sheet 38. Similarly, the upper surface of the board 16 is covered with an upper cover 41 consisting of a steel plate with an aluminum coat. Note that a plurality of ribs 41a are arranged in the widthwise direction. The circuit board 16 is hermetically surrounded by the upper and lower covers 40 and 41 mounted integrally, thus restricting noise. In addition, since the insulating sheet 38 is inserted between the circuit board 16 and the lower cover 40, no short circuit occurs between the board 16 and the cover 40 without forming any unnecessary space therebetween. With this arrangement, a further reduction in size (profile) of the apparatus can be achieved. The arrangement will be described in more detail below.

In the embodiment, the lower cover 40 extends almost horizontally from an intermediate portion (below the fixing unit 5) of the cassette 3a to its distal end (at which the separation pawl 3a4 is disposed), and has a curved portion 40a extending upward from the distal end of the cassette 3a. This curved portion 3a5 and the above-mentioned guide 3a5 constitute part of the convey path for recording media. That is, the leading end of the recording medium 2 fed from the cassette 3a is brought into contact with the guide 3a5 and is guided therealong to the position between the roller 3c and the roller 3e. As the conveyance of the recording medium proceeds with its leading end being clamped between the roller 3c and the roller 3e, the recording medium fed from the cassette 3a is conveyed while its surface is brought into contact with the curved portion 40a, i.e., while the recording medium is guided by the curved portion 40a.

One end of the upper cover 41 is joined to the lower cover 40 at a position near the reverse roller The other end of the upper cover 41 is in surface contact with the lower cover 40 at a position below the fixing unit 5 through a flat portion 41b of the cover 41 extending from a position near the transfer region Y to a position near the inlet guide 5f of the fixing unit 5. This contact portion is fixed to a main body frame 42 with a screw 43. With this arrangement, the flat portion 41b can reliably and stably guide a recording medium, which has undergone toner image transfer processing, to the fixing unit 5. Note that ribs 41a are arranged on the flat portion 41b in the widthwise direction. Since the recording medium is conveyed over the ribs 41a, smooth conveyance is realized by reducing the contact area between the recording medium and the flat portion 41b.

In order to allow the upper and lower covers 40 and 41 to serve as a convey guide for recording media, it is important to make both the upper and lower covers 40 and 41 conductive and grounded and let them have shapes suitable for a guide. The operator normally stores recording media in the cassette 3a upon loosening a set of recording media to improve their separability. In this case, even if a recording medium is charged, the recording medium can be smoothly conveyed while it is guided by the covers 40 and 41 without being electrostatically attracted to the covers 40 and 41.

In the embodiment, as will be described later, the covers 40 and 41 are reliably grounded by using an AC inlet. It is, however, apparent that since the covers 40 and 41 can be grounded by ensuring sufficient contact between the covers and the conductive member of the apparatus main body, the AC inlet need not always be used.

Referring to FIG. 1, reference numeral 45 denotes an AC inlet. A terminal 45a of the AC inlet 45 is connected to the composite electric circuit board 16. A sheet metal tongue portion 45b of the AC inlet 45 is fixed to the main body frame 42 with the screw 43 while the portion 45b is clamped between edges 40c and 41c of the upper and lower covers 40 and 41. Therefore, the upper and lower covers 40 and 41 are reliably grounded through the main body frame 42 to allow the charges of the recording medium 2 to escape to the main body frame 42 through the upper and lower covers 40 and 41 and their edges. Note that reference numeral 45d denotes a machine screw, with which the ground terminal of the inlet 45 is fixed to the sheet metal of the upper cover 41. In the above-described embodiment, a steel cover obtained by forming an aluminum coat or the like on a steel plate is used as each of the upper and lower covers.

The present invention is not limited to this. For example, a deposition sheet obtained by depositing a conductive material such as aluminum on a steel plate or the like may be used. If the upper and lower covers 40 and 41 are left grounded, a large amount of charges on the lower surface of the recording medium 2 escape, and offset may be caused. For this reason, for example, a Teflon-containing paint or the like is preferably coated on the surfaces of the upper and lower covers 40 and 41 to set their surface resistances to be about $10^7$ Ω to $10^{16}$ Ω. In the embodiment, the surface resistances are set to be about $10^{11}$ Ω. As a material for the insulating sheet 38, a resin material such as polycarbonate, ABS, or high-impact styrol may be used.

As described above, according to the embodiment, since the electric circuit board is covered with the cover, noise can be minimized. In addition, since the cover can also serve as a convey guide for recording media, a reduction in size of the apparatus can be realized. Furthermore, by forming the cover from a high-rigidity material (e.g., a steel plate), the cover can also serve as a reinforming member for the main body frame. Note that the upper and lower covers 40 and 41 are integrally joined to each other with the screw 43 at one end and with a screw 43a at the other end in surface contact.

Process Cartridge Mounting Means

Figure 5:
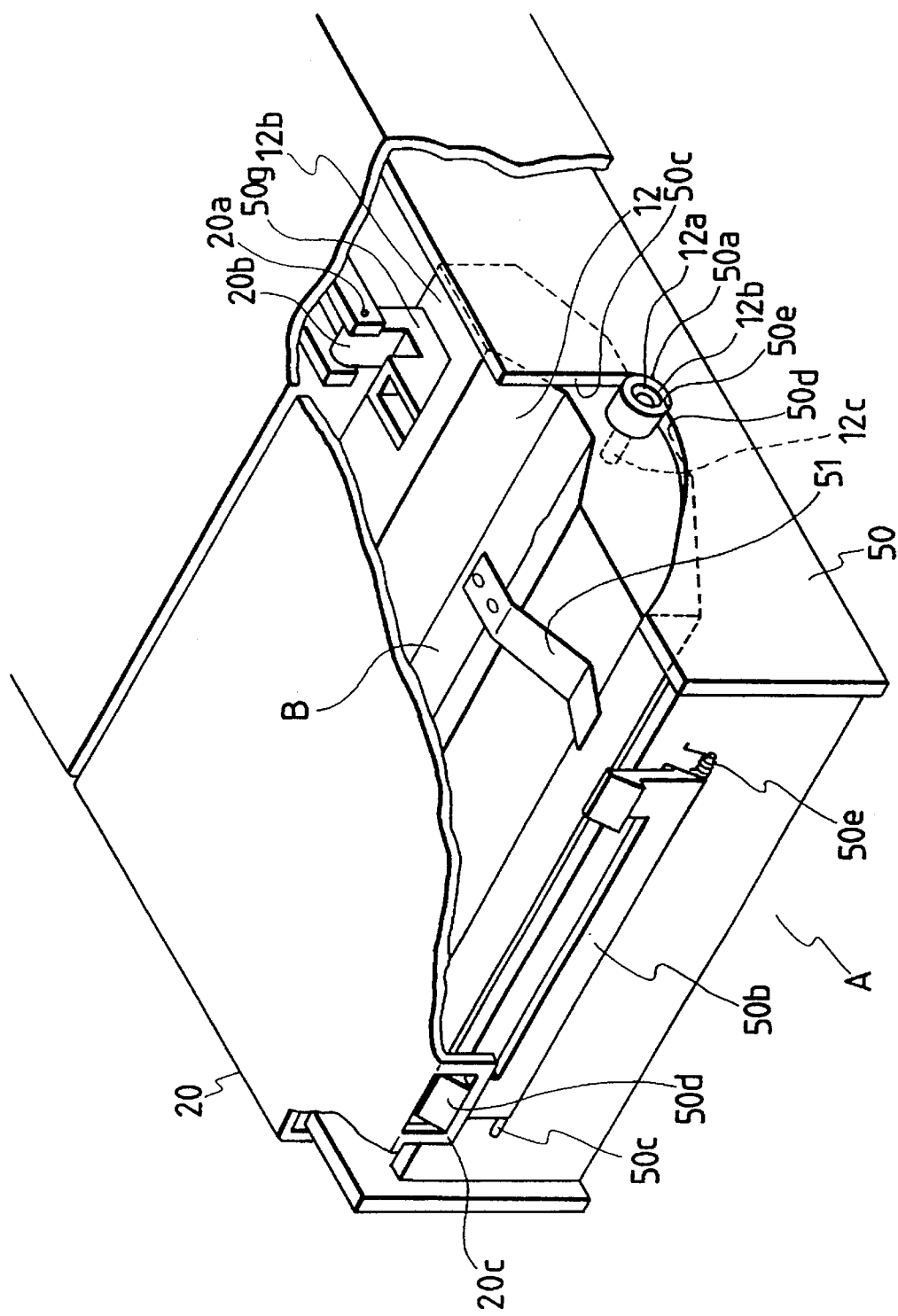
FIG. 5 is a partially cutaway perspective view of a portion of an opening/closing cover.
Figure 6:
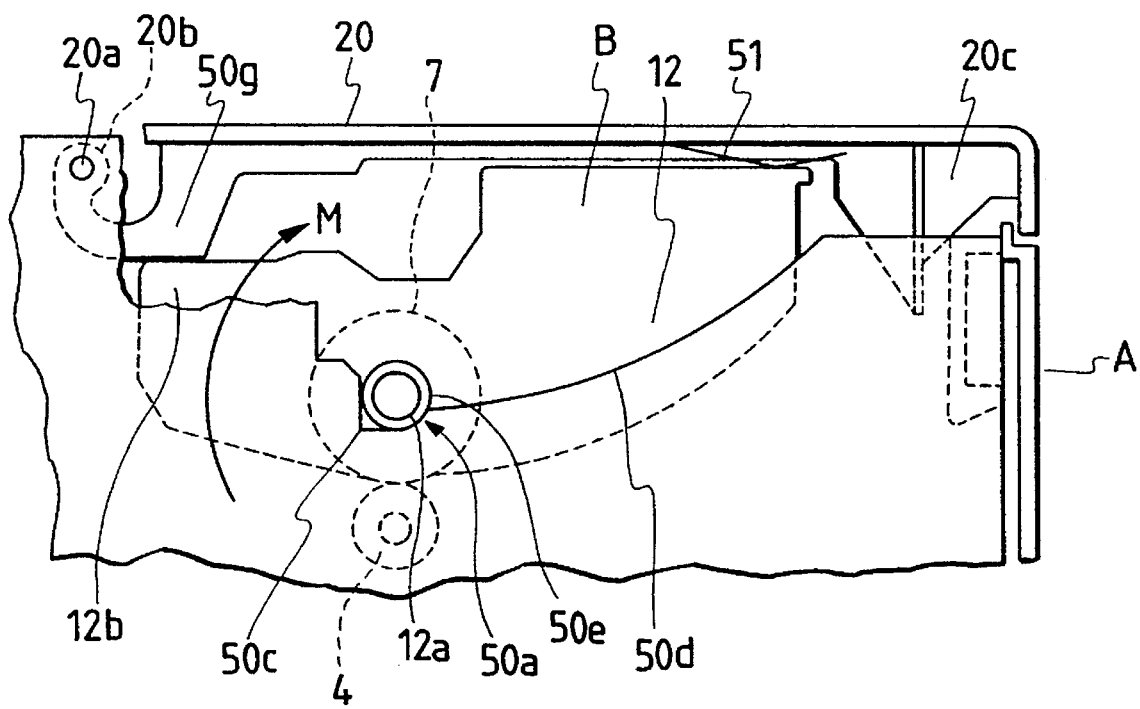
FIG. 6 is a side view showing an ordinary state wherein a process cartridge is mounted.

The process cartridge mounting means will be described below with reference to FIGS. 1, 5, and 6. FIG. 5 is a perspective view showing a state wherein the process cartridge is mounted in the apparatus with its opening/closing cover being closed. FIG. 6 is a side view of the process cartridge, in which part of the structure is schematically illustrated as compared with FIG. 1, and the shapes and the like of some parts are different from those in FIG. 1.

The image forming apparatus A incorporates the cartridge mounting means for mounting the process cartridge B. Mounting/dismounting of the process cartridge B with respect to the apparatus main body A is performed by opening an opening/closing cover 20. More specifically, the opening/closing cover 20 is fixed to an upper portion of the apparatus main body B with a hinge 20a. As indicated by the alternate long and two short dashed lines in FIG. 1, when the opening/closing cover 20 is opened, a cartridge mounting space in the apparatus main body B is seen. Left and right guide members are fixed to the left and right walls inside the apparatus main body. Guides for inserting the process cartridge B are formed on the left and right guide members. When the process cartridge B is inserted along the guides, and the opening/closing cover 20 is closed, the process cartridge B is mounted in the image forming apparatus A. According to the embodiment, the process cartridge B is mounted between the mounting portion 3h of the feed cassette 3a and the stacking unit 6, on which the recording medium 2a which have undergone recording processing are stacked, in a direction perpendicular to the apparatus, by a mounting method to be described in detail below.

The method will be described in detail below.

Referring to FIG. 5, a main frame 50 constituting the main body has a positioning portion 50a for the process cartridge B. The process cartridge B incorporating the photosensitive drum, the developing means, the cleaning means, and the like has a drum positioning pin 12a for axially supporting the photosensitive drum 7 on a process cartridge frame member 12. The drum positioning pin 12a includes an outer flange 12b serving as a bearing, and a drum shaft 12c axially supported on the outer flange 12b. The photosensitive drum 7 fixed to the drum shaft 12c is rotated coaxially with the outer flange 12b. When the opening/closing cover 20 is opened to mount the process cartridge B in the main body, the positioning portion 50a is located on the deeper side of a guide track 50d of the main frame 50 of the main body, along which the outer flange 12b of the drum positioning pin 12a is guided, and is positioned by a rear portion 50c and a semicircular portion 50e located below the rear portion 50c to oppose it.

That is, the rear portion 50c is located at a position to resist a tooth load applied to a drum gear (not shown), and the semicircular portion 50e is brought into contact with the outer surface of the outer flange 12b. The opening/closing cover 20, which is opened/closed when the process cartridge B is replaced or jam processing is performed, has a hinge 20b engaged with an axial support portion 20a of the main frame 50. With this arrangement, the opening/closing cover 20 can be opened/closed. When a lock hole portion 20c formed in the open-side end portion of the opening/closing cover 20 is engaged with a lock 50b formed on the main frame 50, the opening/closing cover 20 is closed. A pawl 50d, of the lock 50b, which is pivotally supported by a shaft 50c, is biased outward to a certain limit by a torsion coil spring 50e. An abutment portion 50g and a pressure spring 51 are formed on the rear surface of the opening/closing cover 20. The abutment portion 50g is brought into contact with an abutment portion 12b of the process cartridge frame member 12. The pressure spring 51 presses the front portion of the process cartridge B.

As shown in FIG. 1, the process cartridge B is inserted from the direction indicated by an arrow R upon opening the opening/closing cover 20, and is pushed into the apparatus main body until the outer flange 12b of the drum positioning pin 12a is brought into contact with the rear portion 50c of the positioning portion 50a of the main frame 50. In this case, since the photosensitive drum 7 is pushed up by the pressing force of the transfer roller 4 but is not restricted by the abutment portion 50g and the pressure spring 51 of the opening/closing cover 20, the process cartridge B is not positioned yet. When the opening/closing cover 20 is closed until the lock hole portion 20c is engaged with the lock 50b, the process cartridge abutment portion 50g of the opening/closing cover 20 is brought into contact with the abutment portion 12b of the cartridge frame member 12, thus pushing up the rear portion of the process cartridge B. The outer flange 12b of the photosensitive drum positioning pin 12a is then brought into contact with the positioning portion 50a of the main frame 50. As a result, the photosensitive drum 7 is positioned.

In addition, since the process cartridge pressure spring 51 presses the front portion of the process cartridge B downward, the center of the photosensitive drum 7 is always pressed against the positioning portion 50a of the main frame 50 with the abutment portion 50g serving as a fulcrum. When the operation of the apparatus main body is started in this state, a drum gear (not shown) receives a rotational force from a driving gear (not shown), and a moment M is applied to the overall process cartridge B with the photosensitive drum 7 serving as the center so as to rotate the process cartridge B in the clockwise direction in FIG. 6. In the embodiment, since the process cartridge abutment portion 50g of the opening/closing cover 20 receives this force, the posture of the process cartridge B is stabilized. Even if the moment M is abruptly eliminated due to a torque variation, and the process cartridge B tries to rotate in the counterclockwise direction, the process cartridge pressure spring 51 can absorb such a rotational force. The force, based on the tooth load of the drum gear (not shown), which tries to cause the process cartridge B to float acts more on the main body abutment portion 50g than on the pressure spring 51. Therefore, the process cartridge B does not float. As described above, in the embodiment, the posture of the process cartridge B is stably held even at the start time of the apparatus main body.

Overall Arrangement of Apparatus

In the embodiment, as described above, the recording medium 2 fed from the feed cassette 3a arranged at the lower portion of the apparatus passes through a so-called "S"-shaped path, and is stacked on the stacking unit 6 arranged at the upper portion of the apparatus after the recording medium 2 is reversed twice. The feed cassette 3a is arranged at the lowermost portion of the apparatus in the direction of the height of the apparatus (in the vertical direction), and the electric circuit board 16 and the fixing unit 5 are arranged above the cassette 3a in this order. The laser scanner unit 1a and the process cartridge B are then arranged above the fixing unit 5. The stacking unit 6 on which recording media which have undergone recording processing are stacked is located at the uppermost portion of the apparatus to cross these components. In addition, the feed cassette 3a is completely housed in the apparatus main body A and does not protrude from the apparatus main body A. In the horizontal direction, the fixing unit 5, the laser scanner unit 1a, and the process cartridge B are arranged almost in a line in the apparatus. Furthermore, these three components are arranged so as not to overlap each other in the direction of height. The electric circuit board 16 is located above the feed cassette 3a and is arranged below the laser scanner unit 1a and the process cartridge B to cross them. In addition, since the upper and loser covers 40 and 41 are arranged to cover both the upper and lower surfaces of the electric circuit board 16, noise can be prevented almost completely. Moreover, since part of the covers 40 and 41 is located between the distal end of the feed cassette and the reverse roller 3c, and another part of the covers 40 and 41 is located between the copy region Y and the fixing unit 5, the covers also serve as a convey guide for recording media.

The laser scanner unit 1a is inclined in the same direction as the direction of inclination of the stacking surface 6a of the stacking unit 6 to emit a laser beam in the same direction of inclination.

With the above-described arrangement, the embodiment realizes a reduction in size of the apparatus in both the direction of height (vertical direction) and the horizontal direction. Furthermore, in spite of the reduction in height (low-profile), a sufficient number of recording media can be stacked on the stacking unit 6.

In addition, according to the embodiment, in the horizontal direction, the process cartridge B, the laser scanner unit 1a, and the fixing unit 5 are sequentially arranged in the apparatus in the order named from the apparatus front surface (front side) F side, and hence mounting/dismounting of the process cartridge B can be performed from the front side of the apparatus. Therefore, the mounting/dismounting performance of the cartridge is improved.

Furthermore, all the following operations can be performed from the front surface F side of the apparatus main body: the mounting/dismounting operation of the feed cassette (in the direction indicated by the arrow Z in FIG. 1), the mounting/dismounting operation of the process cartridge (in the direction indicated by the arrow R in FIG. 1), and removing of the recording media 2 which have undergone recording processing and are stacked on the stacking unit (in the direction indicated by the arrow S in FIG. 1). Therefore, the operability of these operations performed by the operator is greatly improved.

Another Embodiment

The schematic functional block diagram of the above-described apparatus will be described next with reference to FIG. 7.

Figure 7:
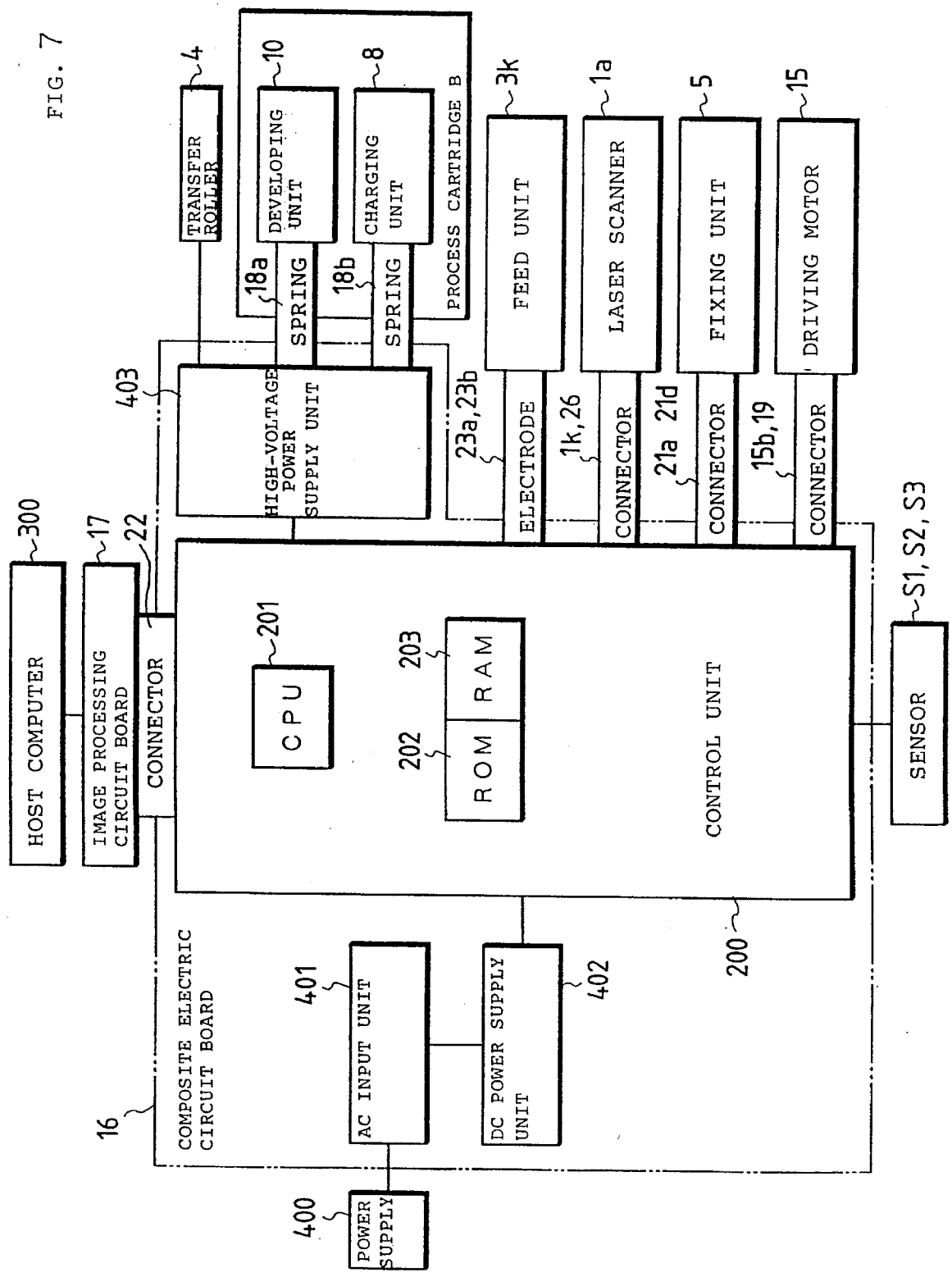
FIG. 7 is a schematic functional block diagram.

Referring to FIG. 7, reference numeral 200 denotes the control unit for performing the overall control of the apparatus. The control unit 200 includes the CPU 201 such as a microprocessor, the ROM 202 for storing control programs for the CPU 201 and various data, the RAM 203 used as a work area of the CPU 201 and designed to temporarily store various data, and the like.

The control unit 200 is arranged on the composite electric circuit board 16 and receives various information from a host computer 300 through the image processing circuit board 17. The control Unit 200 controls the feed unit 3k, the laser scanner 1a, the transfer roller 4, the fixing unit 5, the driving motor 15, the developing unit 10, the charging roller 8, and the like on the basis of these pieces of information and the like.

In the embodiment, the composite electric circuit board, which is obtained by mounting all the AC input unit 401, the DC power supply unit 402, the high-voltage power supply unit 403, and the control circuit unit on one printed board, is exemplified. It is apparent, however, that even if the respective elements are mounted on different printed boards, and they are coupled to each other afterward, the same effect as that described above can be obtained. In addition, the electric circuit board need not include all the components described above, i.e., the AC input unit, the DC power supply unit, the high-voltage power supply unit, the control circuit unit, and the like, but may include at least one of them. However, the more the electric circuit board includes components, the better the effect is.

Another Embodiment

Another embodiment will be described in detail below with reference to FIGS. 8 to 10. Note that the same reference numerals in this embodiment denote the same parts having the same functions as in the above-described embodiment, and the above description will be quoted.

Figure 8:
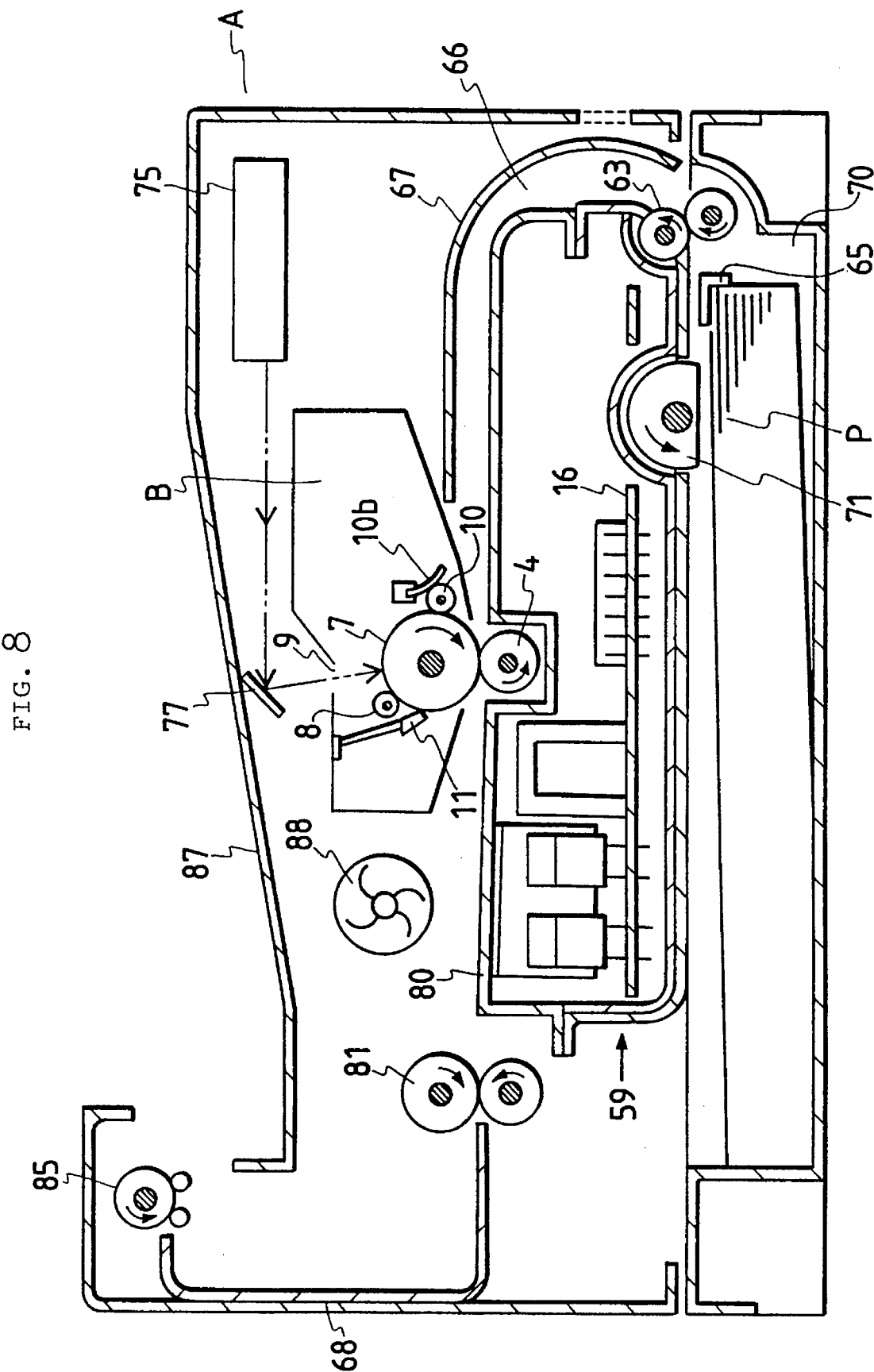
FIG. 8 is a sectional side view of a laser beam printer to which another embodiment of the present invention is applied.

FIG. 8 is a schematic sectional view of the main part of a compact laser beam printer. Referring to FIG. 8, a composite electric equipment unit 9 is arranged to be adjacent to the lower surface (lower side) of a convey guide plate 80. A paper feed cassette 70 in which recording sheets P are stored is arranged to oppose the convey guide plate 80 through the composite electric equipment unit 9.

The recording sheets P stacked on the paper feed cassette 70 are fed upon rotation of a pickup roller 71. At this time, the recording sheets P are separated one by one by a separation pawl 65. The recording sheet P is then conveyed to a transfer roller 4 by a convey roller pair 63 through a convey path 66 of an inlet convey guide 67 while the recording sheet P is aligned with a reference surface to prevent skew movement, and a registration sensor (not shown) is operated. In this case, this convey operation is synchronized with image information light which is emitted from a laser scanner unit 75 in response to a signal from the registration sensor, reflected by a reflecting mirror 77, and radiated on a photosensitive drum 7 of a process cartridge B.

The image formed on the photosensitive drum 7 upon radiation of the laser beam is developed by a toner. The toner image is then transferred onto the recording sheet P by the transfer roller A. The recording sheet P on which the toner image is transferred is separated from the photosensitive drum 7 and is conveyed to a fixing unit 81 through the convey guide plate 80. The toner image on the recording sheet is fixed by the fixing unit 81. The resultant sheet is guided by a convey guide 68 as a U-turn path and is discharged onto a discharge tray 87 on the upper portion of the apparatus main body by a discharging roller pair 85 with the image-formed surface of the recording sheet P facing down. Reference numeral 88 denotes a fan for producing an air flow.

The arrangement of portions around the composite electric circuit board 16 and the paper feed cassette 70 and their positional relationship in this embodiment will be described in detail next with reference to FIGS. 9 and 10.

Figure 9:
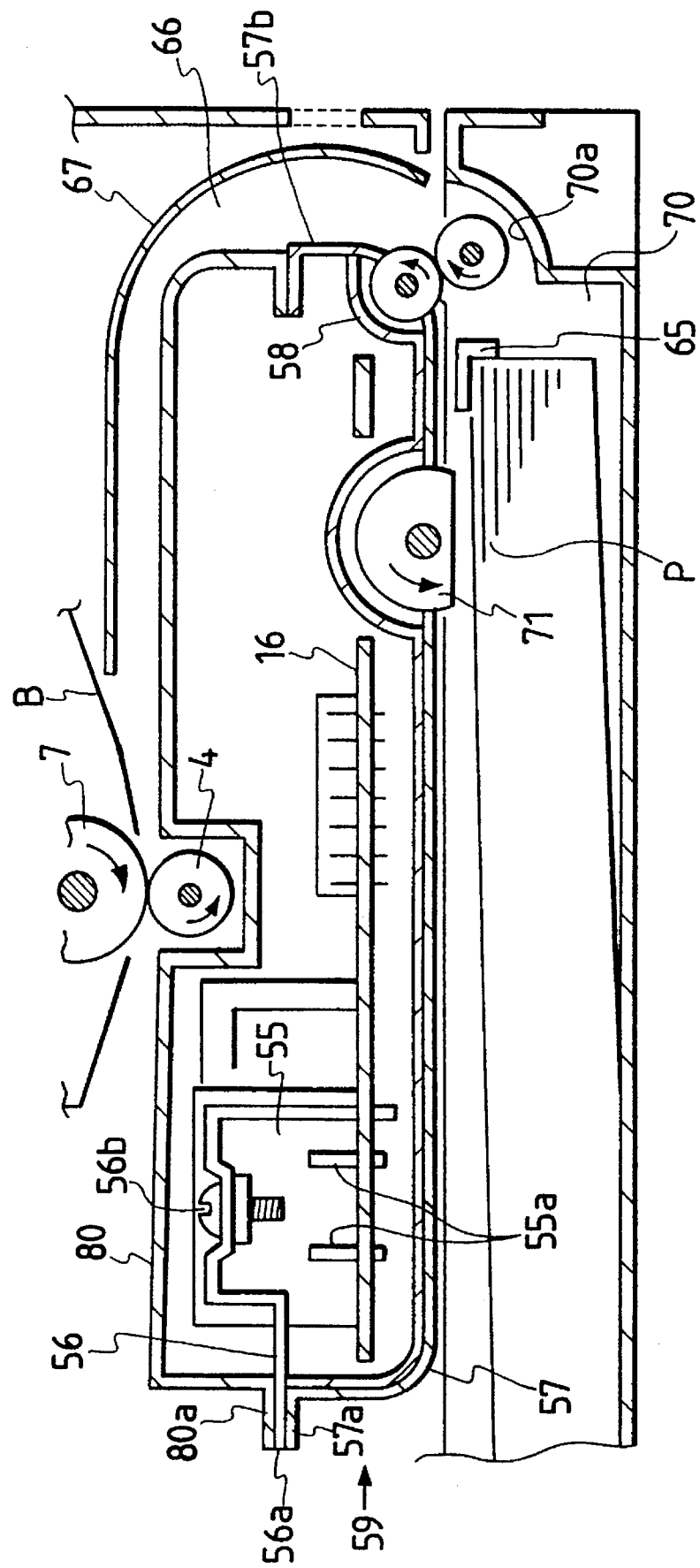
FIG. 9 is a sectional side view of a portion near an electric equipment unit.

FIG. 9 is a sectional view showing a convey unit (the convey guide plate 80), an electric equipment unit 59 (the composite electric circuit board 16, an electric equipment member for a power supply, a conductive cover 57, and an insulating case 58), and the paper feed cassette 70 in detail. FIG. 10 shows a detailed arrangement of part of the structure in FIG. 9.

In the electric equipment unit 59 shown in FIG. 9, at least one of the following electric equipment members is mounted on the composite electric circuit board 16: an AC power supply circuit through which the apparatus main body receives AC power, a low-voltage power supply circuit for converting the AC power into DC power, a high-voltage power supply circuit for converting low-voltage power into high-voltage power to perform image formation by an electrophotographic process, a control circuit for controlling the apparatus main body, and the like. The resultant circuit board 16 is then housed in one thin-walled insulating case 58 consisting of a molding resin, e.g., an ABS resin or a polycarbonate resin, so as to be formed into a unit. The unit is arranged on a portion (bottom portion), of the apparatus main body 51, which is located close to and opposes the lower surface of the convey guide plate 80. Note that the insulating case 58 may be formed by bonding a vinyl chloride or polyethylene terephthalate film on a member consisting of a material other than the above-mentioned resin. The insulating case 58 is covered with a conductive cover 57 consisting of a rigid material having good surface conductivity, such as a steel plate with an aluminum coat or a steel plate with a zinc coat. The insulating case 58 is supported on the conductive cover 57. The conductive cover 57 is fixed to a frame (not shown) of the apparatus main body.

Figure 10:
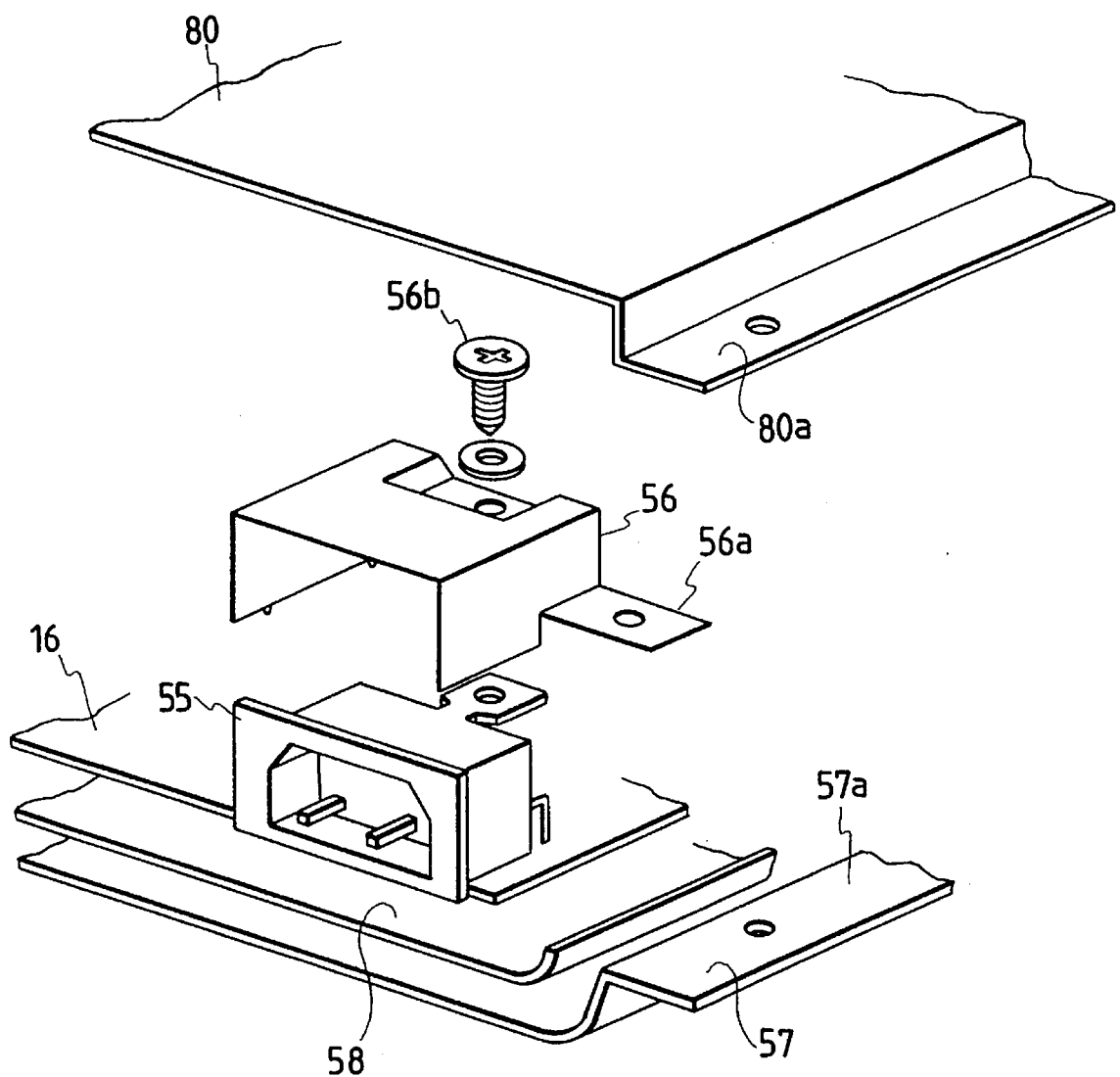
FIG. 10 is a perspective view showing a method of mounting an AC inlet.

As shown in FIGS. 9 and 10, a flange 56a of an AC inlet cover 56 consisting of a metal sheet, which is connected to the FG (frame ground) terminal of an AC inlet 55 is clamped/fixed between a flange portion 57a of the conductive cover 57 and a flange 80a of the convey guide plate 80. With this arrangement, the convey guide plate 80 and the conductive cover 57 are set to an FG potential. Note that reference numeral 55a denotes an inlet terminal; and 56b, a screw.

In addition, as shown in FIGS. 9 and 10, the flanges 80a and 57a respectively formed at the edges of the convey guide plate 80 and the conductive cover 57 are brought into contact and fixed with each other, thus constituting a closed structure. The paper feed cassette 70 has a recording sheet P storage portion facing the conductive cover 57. A convey guide portion 57b of the conductive cover 57, which is continuous with the convey guide plate 80 constitutes a convey path 66 having an inward curve when viewed from the left so as to be spaced apart from an outlet path wall 70a of the paper feed cassette 70 and the inlet convey guide 67.

When the recording sheet P is picked up from the paper feed cassette 70 disposed below the electric equipment unit 59, the recording sheet P is conveyed in contact with the conductive cover 57. Since the potential of the conductive cover 57 is decreased to the FG potential, the charges on the recording sheet P can be removed at the contact portion between the recording sheet P and the conductive cover 57.

With the above-described arrangement, the following advantages can be obtained:

① Since the electric equipment unit 59 is fixed to the frame (not shown) of the apparatus main body A through the conductive cover 57 having high rigidity, the conductive cover 57 serves as a reinforcing member for the frame of the apparatus main body A, thus increasing the strength of the main body frame.

② since the recording sheet P is conveyed from the paper feed cassette 70 to the transfer unit while the recording sheet P is in contact with the conductive cover 57 whose potential is decreased to the FG potential, the charges on the recording sheet P can be easily removed. Therefore, an improvement in the quality of a transferred image is realized.

③ Since an electric equipment member is housed in the box-like space formed by a material having good surface conductivity, the outside of the electric equipment member constitutes a closed loop of FG. With this arrangement, noise generated by electric circuits in the electric equipment portion can be easily prevented.

④ The conventional arrangement of the portions around the electric equipment unit (i.e., insulating sheet, conductive sheet and insulating resin) can be simplified (into thin) film resin and conductive member), thereby further improving the assembly efficiency.

Process Cartridge

The arrangement of each component of the process cartridge B mounted in the image forming apparatus A will be described next.

The process cartridge B includes an image bearing member and at least one process means. In this case, the process means includes a charging means for charging the surface of the image bearing member, a developing means for forming a toner image on the image bearing member, a cleaning means for removing the residual toner on the surface of the image bearing member, and the like. As shown in FIG. 1, the process cartridge B of the embodiment is designed such that a charging means 8, an exposure opening 9, a developing means 10, and a cleaning means 11 are arranged around the photosensitive drum 7 as an image bearing member, and these components are covered with a housing constituted by a frame member 12 to form an integral structure. This structure is designed to be detachable from the apparatus main body A.

The arrangements of the respective components of the process cartridge B, i.e., the photosensitive drum 7, the charging means 8, the exposure unit 9, the developing means 10, and the cleaning means 11 will be described below in the order named.

Photosensitive Drum

The photosensitive drum 7 according to the embodiment is formed by coating an organic photosensitive layer on the outer surface of a cylindrical drum base member formed of aluminum. The photosensitive drum 7 is pivotally fixed to the frame member 12. The photosensitive drum 7 is rotated in the direction indicated by the arrow in FIG. 1 in accordance with an image forming operation by transmitting the driving force of a driving motor mounted on the apparatus main body side to a gear (not shown) fixed to one end of the drum 7 in the longitudinal direction.

Charging Means

The charging means serves to uniformly charge the surface of the photosensitive drum 7. In the embodiment, a so-called contact charging method is used, in which a charging roller 8 is pivotally mounted on the frame member 12. The charging roller 8 is formed as follows. First a conductive elastic layer is formed on a roller shaft 8a. An elastic layer having a high resistance is formed on the conductive elastic layer. A protective film is further formed on the surface of the resultant structure. The conductive elastic layer is formed by dispersing carbon particles in an elastic rubber layer such as an EPDM or NBR layer, and serves to introduce a bias voltage applied to the roller shaft 8a. The high-resistance elastic layer is composed of a urethane rubber layer containing a small amount of conductive powder, for example. The high-resistance elastic layer serves to prevent an abrupt drop in bias voltage by restricting a leak current to the photosensitive drum 7 even when the charging roller having high conductivity is brought into contact with pinholes and the like of the photosensitive drum 7. The protective layer is constituted by an N-methylmethoxy nylon layer, for example. The protective layer prevents the plastic material of the conductive elastic layer or of the high-resistance elastic layer from coming into contact with the photosensitive drum 7, thus preventing a change in properties of the surface of the photosensitive drum 7.

In an image forming operation, the charging roller 8 is brought into contact with the photosensitive drum 7 and is rotated upon rotation of the photosensitive drum 7. At this time, by applying DC and AC voltages to the charging roller 8 upon superposing the voltages, the surface of the photosensitive drum 7 is uniformly charged.

Exposure Unit

The exposure opening 9 serves to form an electrostatic latent image on the surface, of the photosensitive drum 7, which has been uniformly charged by the charging roller 8, by focusing an optical image radiated from an optical system 1 onto the drum surface. The exposure unit is constituted by an optical path which is formed above the developing means 10 to guide the optical image. The charging roller 8 and the cleaning means 11 are arranged on the upstream side of the optical path with respect to the direction of rotation of the drum 7, and the developing means 10 is arranged on the downstream side.

Developing Means

As shown in FIG. 1, the developing means 10 has a toner container 10a for storing a toner t. A toner feed member (not shown) which is rotated to feed the toner is arranged in the toner container 10a. In addition, a developing sleeve 10 incorporating a magnet (not shown) is arranged to oppose the photosensitive drum 7 with a small gap. The developing sleeve 10 is rotated to form a thin toner layer on its surface. The small gap is ensured by spacers (not shown) which are respectively fixed to the two ends of the developing sleeve 10 in the longitudinal direction to be in contact with the surface of the photosensitive drum 7.

When a toner layer is formed on the surface of the developing sleeve, frictional charges large enough to develop the electrostatic latent image on the photosensitive drum are obtained from the friction between the toner and the developing sleeve. A developing blade 10b is arranged to regulate the thickness of a toner layer.

Cleaning Means

As shown in FIG. 1, the cleaning means 11 is constituted by a cleaning blade 11 which is brought into contact with the surface of the photosensitive drum 7 to scrape off the residual toner on the drum 7, a scooping sheet (not shown) which is located below the blade 11 and is in slight contact with the surface of the photosensitive drum 7 to scoop the scraped toner, and a waste toner container 11b for storing the scraped waste toner.

The above-described process cartridge is a cartridge in which the charging means, the developing means or the cleaning means, and the electrophotographic photosensitive member are integrally incorporated. This cartridge is designed to be detachable from the image forming apparatus. Alternatively, at least one of the charging means, the developing means, and the cleaning means, and the electrophotographic photosensitive member are integrated into a cartridge to be detachable with respect to the main body of the image forming apparatus. In addition, the process cartridge is a cartridge in which at least the developing means and the electrophotographic photosensitive member are integrally incorporated so as to be detachable from the apparatus main body.

According to the present invention described in detail above, there is provided an image forming apparatus which can realize a further reduction in size.

What is claimed is:

1. An image forming apparatus for forming an image on a recording medium, said apparatus comprising:

a mounting mechanism for removably mounting a process cartridge, the process cartridge including an electrophotographic photosensitive member, a charging roller to charge said photosensitive member, a developing member to develop a latent image formed on said photosensitive member and a cleaning member to remove residual toner from said photosensitive member;

a transfer device for transferring a toner image, formed on said electrophotographic photosensitive member, onto the recording medium;

a fixing device for fixing the toner image, transferred onto the recording medium by said transfer device, on the recording medium;

a laser beam emitter, arranged between said process cartridge mounted onto said mounting mechanism and said fixing device to be located within a height of said process cartridge mounted onto said mounting mechanism in a vertical direction, for emitting a laser beam in accordance with image information;

a feed cassette for storing the recording medium, said feed cassette arranged below said process cartridge, said laser beam emitter, and said fixing device to extend therealong;

a recording medium receiver for receiving a recording medium on which an image has been formed; and a conveying mechanism for guiding a recording medium fed from said feed cassette to a position between said electrophotographic photosensitive member and said transfer device by reversing a path travelled by the recording medium, and guiding the recording medium, on which a toner image has been transferred from said electrophotographic photosensitive member and which has passed through said fixing device, to the recording medium receiver by reversing the path of the recording medium again, wherein the recording medium receiver is arranged on an upper surface of an apparatus main body so as to be inclined obliquely upward in the same direction as a direction in which said laser beam emitter emits the laser beam wherein said recording medium receiver receives a recording medium discharged from an apparatus main body while a leading end of the recording medium is laid substantially horizontally and a trailing end of the recording medium is inclined, wherein said mounting mechanism, said laser beam emitter, and said fixing device are arranged so as to not overlap each other in a vertical direction, and wherein said laser beam emitter is arranged between said process cartridge and said fixing device for fixing an image on the recording medium so as not to overlap said process cartridge and said fixing device in a vertical direction.

2. An image forming apparatus for forming an image on a recording medium, comprising:

an image bearing member;

image forming means for forming a toner image on said image bearing member;

transfer means for transferring the toner image, formed on said image bearing member, onto the recording medium;

fixing means for fixing the toner image, transferred onto the recording medium by said transfer means, on the recording medium;

recording medium receiving means for receiving the recording medium on which the image is fixed by said fixing means; and laser beam emitting means, arranged below said recording medium receiving means for emitting a laser beam in accordance with image information so as to cause said image forming means to form an image, wherein said laser beam emitting means is arranged below the recording medium receiving means and emits a laser beam obliquely upward at an angle of about 9 to 12.5 degrees with respect to a horizontal direction.

3. An image forming apparatus according to claim 2, wherein said recording medium receiving means is arranged on an upper surface of an apparatus main body so as to be inclined obliquely upward in the same direction as a direction in which the laser beam is emitted.

4. An image forming apparatus according to claim 1, wherein a recording medium on which an image is formed is discharged in the same direction as a direction in which the laser beam emitted from said laser beam emitting means propagates, and is received by said recording medium receiving means.

5. An image forming apparatus according to claim 1, wherein said laser beam emitting means is arranged such that a laser beam emission hole is directed obliquely upward.

6. An image forming apparatus according to claim 1, wherein said laser beam emitting means is a laser scanner unit incorporating a laser diode for emitting a laser beam in accordance with the image information, a polygon mirror, and an imaging lens.

7. An image forming apparatus according to claim 1, wherein said image forming means includes charging means for charging said image bearing member, developing means for developing a latent image formed on said image bearing member, and cleaning means for removing a residual toner on said image bearing member.

8. An image forming apparatus according to claim 1, wherein said image forming means includes charging means for charging said image bearing member, developing means for developing a latent image formed on said image bearing member, and cleaning means for removing a residual toner on said image bearing member, and said image bearing member, said charging means, said developing means, and said cleaning means being integrally formed into a process cartridge which is designed to be detachable from an apparatus main body.

9. An image forming apparatus according to claim 8, wherein said laser beam emitting means is arranged within a height of said process cartridge in a vertical direction.

10. An image forming apparatus according to claim 8, wherein said laser beam emitting means is arranged between said process cartridge and fixing means for fixing an image on the recording medium so as not to overlap said process cartridge and said fixing means in a vertical direction.

11. An image forming apparatus according to claim 8, further comprising a feed cassette for storing the recording medium, said feed cassette arranged below said process cartridge, said laser beam emitting means, and said fixing means to extend therealong.

12. An image forming apparatus according to claim 1, further comprising a feed cassette for storing the recording medium, wherein the recording medium is fed from said feed cassette and reaches said image forming means after a path travelled by the recording medium is reversed, and the recording medium reaches said recording medium receiving means while the path travelled by the recording medium is reversed again after an image forming operation.

13. An image forming apparatus according to claim 1, further comprising a convey guide extending from said image bearing member to said fixing means, wherein said laser beam emitting means is arranged above said convey guide.

14. An image forming apparatus according to claim 1, further comprising an electric circuit board arranged below said laser beam emitting means.

15. An image forming apparatus according to claim 1, wherein said image forming apparatus is a laser beam printer.

16. An image forming apparatus according to claim 1, wherein said image forming apparatus is an electrophotographic copying machine.

17. An image forming apparatus according to claim 1, wherein said image forming apparatus is a facsimile apparatus.

18. An image forming apparatus according to claim 1, wherein a recording medium on which an image is formed is discharged in the same direction as a direction in which the laser beam emitted from said laser beam emitting means propagates, and is received by said recording medium receiving means.

19. An image forming apparatus according to claim 1, wherein said recording medium receiving means is arranged on an upper surface of an apparatus main body so as to be inclined obliquely upward in the same direction as a direction in which the laser beam is emitted.

20. An image forming apparatus according to claim 1, wherein said transfer means includes a transfer roller.

21. An image forming apparatus according to claim 1, wherein said fixing means includes a ceramic heater, a heat-resistant film, and a pressure roller for pressing the recording medium against said ceramic heater through said heat-resistant film.

22. An image forming apparatus for forming an image on a recording medium, comprising:

an image bearing member;

image forming means for forming a toner image on said image bearing member;

transfer means for transferring the toner image formed on said image bearing member, onto the recording medium;

fixing means for fixing the toner image, transferred onto the recording medium by said transfer means, on the recording medium;

recording medium receiving means for receiving the recording medium on which the image is fixed by said fixing means; and laser beam emitting means, arranged below said recording medium receiving means, for emitting a laser beam in accordance with image information so as to cause said image forming means to form an image, wherein said laser beam emitting means is arranged below the recording medium receiving means and emits a laser beam obliquely upward, and wherein said recording medium receiving means receives a recording medium discharged from an apparatus main body while a leading end of the recording medium is laid substantially horizontally and a trailing end of the recording medium is inclined.

23. An image forming apparatus according to claim 22, wherein said recording medium receiving means is arranged on an upper surface of an apparatus main body so as to be inclined obliquely upward in the same direction as a direction in which the laser beam is emitted.

24. An image forming apparatus according to claim 22, wherein a recording medium on which an image is formed is discharged in the same direction as a direction in which the laser beam emitted from said laser beam emitting means propagates, and is received by said recording medium receiving means.

25. An image forming apparatus according to claim 22, wherein said laser beam emitting means is arranged such that a laser beam emission hole is directed obliquely upward.

26. An image forming apparatus according to claim 22, wherein said laser beam emitting means is a laser scanner unit incorporating a laser diode for emitting a laser beam in accordance with the image information, a polygon mirror, and an imaging lens.

27. An image forming apparatus according to claim 22, wherein said image forming means includes charging means for charging said image bearing member, developing means for developing a latent image formed on said image bearing member, and cleaning means for removing a residual toner on said image bearing member.

28. An image forming apparatus according to claim 22, wherein said image forming means includes charging means for charging said image bearing member, developing means for developing a latent image formed on said image bearing member, and cleaning means for removing a residual toner on said image bearing member, and said image bearing member, said charging means, said developing means, and said cleaning means being integrally formed into a process cartridge which is designed to be detachable from an apparatus main body.

29. An image forming-apparatus according to claim 28, wherein said laser beam emitting means is arranged within a height of said process cartridge in a vertical direction.

30. An image forming apparatus according to claim 28, wherein said laser beam emitting means is arranged between said process cartridge and said fixing means so as not to overlap said process cartridge and said fixing means in a vertical direction.

31. An image forming apparatus according to claim 28, further comprising a feed cassette for storing the recording medium, said feed cassette arranged below said process cartridge, said laser beam emitting means, and said fixing means to extend therealong.

32. An image forming apparatus according to claim 22, further comprising a feed cassette for storing the recording medium, wherein the recording medium is fed from said feed cassette and reaches said image forming means after a path travelled by the recording medium is reversed, and the recording medium reaches said recording medium receiving means while the recording medium is reversed again after an image forming operation.

33. An image forming apparatus according to claim 22, further comprising a convey guide extending from said image bearing member to said fixing means, wherein said laser beam emitting means is arranged above said convey guide.

34. An image forming apparatus according to claim 22, further comprising an electric circuit board arranged below said laser beam emitting means.

35. An image forming apparatus according to claim 22, wherein said image forming apparatus is a laser beam printer.

36. An image forming apparatus according to claim 22, wherein said image forming apparatus is an electrophotographic copying machine.

37. An image forming apparatus according to claim 22, wherein said image forming apparatus is a facsimile apparatus.

38. An image forming apparatus according to claim 22, wherein a recording medium on which an image is formed is discharged in the same direction as a direction in which the laser beam emitted from said laser beam emitting means propagates, and is received by said recording medium receiving means.

39. An image forming apparatus according to claim 22, wherein said recording medium receiving means is arranged on an upper surface of an apparatus main body so as to be inclined obliquely upward in the same direction as a direction in which the laser beam is emitted.

40. An image forming apparatus according to claim 22, wherein said transfer means includes a transfer roller.

41. An image forming apparatus according to claim 22, wherein said fixing means includes a ceramic heater, a heat-resistant film, and a pressure roller for pressing the recording medium against said ceramic heater through said heat-resistant film.

42. An image forming apparatus for forming an image on a recording medium, said apparatus comprising:

mounting means for removably mounting a process cartridge, said process cartridge including an electrophotographic photosensitive member and process means acting on said electrophotographic photosensitive member;

laser beam emitting means for emitting a laser beam on said electrophotographic photosensitive member in said process cartridge mounted onto said mounting means in accordance with image information;

fixing means for fixing a toner image on the recording medium; and recording medium receiving means for receiving the recording medium on which the image is fixed by said fixing means, wherein said mounting means, said laser beam emitting means and said fixing means are arranged in a horizontal direction and arranged so as not to overlap each other in a vertical directions, wherein said laser beam emitting means is arranged below the recording medium receiving means and emits a laser beam obliquely upward, and wherein said recording medium receiving means receives the recording medium discharged from a main body of said image forming apparatus while a leading end of the recording medium is laid substantially horizontally and a trailing end of the recording medium is inclined.

43. An image forming apparatus according to claim 42, wherein a feed cassette is mounted in a lowermost portion of said apparatus, and said mounting means, said laser beam emitting means, and said fixing means are located above said feed cassette.

44. An image forming apparatus according to claim 42, wherein mounting/dismounting of said process cartridge in/from an apparatus main body is performed from a side on which said mounting means is arranged.

45. An image forming apparatus according to claim 42, wherein mounting/dismounting of said process cartridge, mounting/dismounting of a feed cassette, and removal of recording media stacked on a stacking unit are performed from the same side of an apparatus main body.

46. An image forming apparatus according to claim 42, wherein said process cartridge is formed by integrating said electrophotographic photosensitive member as an image bearing member and charging means for charging said photosensitive member, developing means for developing a latent image formed on said photosensitive member, or cleaning means for removing a residual toner on said photosensitive member as said process means into a cartridge, said cartridge being designed to be detachable from an image forming apparatus main body.

47. An image forming apparatus according to claim 42, wherein said process cartridge is formed by integrating said electrophotographic photosensitive member as an image bearing member and at least one of charging means for charging said photosensitive member, developing means for developing a latent image formed on said photosensitive member, and cleaning means for removing a residual toner on said photosensitive member as said process means into a cartridge, said cartridge being designed to be detachable from an image forming apparatus main body.

48. An image forming apparatus according to claim 42, wherein said process cartridge is formed by integrating at least developing means for developing a latent image formed on said photosensitive member and said electrophotographic photosensitive member into a cartridge, said cartridge being designed to be detachable from an image forming apparatus main body.

49. An image forming apparatus according to claim 42, wherein said laser beam emitting means is arranged such that a laser beam emission hole is directed obliquely upward.

50. An image forming apparatus according to claim 42, wherein said laser beam emitting means is a laser scanner unit incorporating a laser diode for emitting a laser beam in accordance with the image information, a polygon mirror, and an imaging lens.

51. An image forming apparatus according to claim 42, wherein said laser beam emitting means is arranged within a height of said process cartridge in a vertical direction.

52. An image forming apparatus according to claim 42, wherein said laser beam emitting means is arranged between said process cartridge and fixing means for fixing an image on the recording medium so as not to overlap said process cartridge and said fixing means in a vertical direction.

53. An image forming apparatus according to claim 42, further comprising a feed cassette for storing the recording medium, said feed cassette arranged below said process cartridge, said laser beam emitting means, and said fixing means to extend therealong.

54. An image forming apparatus according to claim 42, further comprising a feed cassette for storing the recording medium, wherein the recording medium is fed from said feed cassette and reaches said photosensitive member after a path travelled by the recording medium is reversed, and the recording medium reaches said recording medium receiving means while the path travelled by the recording medium is reversed again after an image forming operation.

55. An image forming apparatus according to claim 42, further comprising a convey guide extending from said photosensitive member to said fixing means, wherein said laser beam emitting means is arranged above said convey guide.

56. An image forming apparatus according to claim 42, further comprising an electric circuit board arranged below said laser beam emitting means.

57. An image forming apparatus according to claim 42, wherein said image forming apparatus is a laser beam printer.

58. An image forming apparatus according to claim 42, wherein said image forming apparatus is an electrophotographic copying machine.

59. An image forming apparatus according to claim 42, wherein said image forming apparatus is a facsimile apparatus.

60. An image forming apparatus according to claim 44, wherein said process cartridge mounted in said mounting means, said laser beam emitting means, and said fixing means are arranged so as not to overlap each other in a vertical direction.

61. An image forming apparatus according to claim 42, further comprising recording medium receiving means arranged on an upper surface of an apparatus main body so as to be inclined obliquely upward in the same direction as a direction in which the laser beam is emitted.

62. An image forming apparatus according to claim 61, wherein said recording medium receiving means receives a recording medium discharged from an apparatus main body while a leading end of the recording medium is laid horizontally and a trailing end of the recording medium is inclined.

63. An image forming apparatus for forming an image on a recording medium, said apparatus comprising:

mounting means for removably mounting a process cartridge, said process cartridge including an electrophotographic photosensitive member and process means acting on said electrophotographic photosensitive member;

transfer means for transferring a toner image, formed on said electrophotographic photosensitive member included in said process cartridge, onto the recording medium;

fixing means for fixing the toner image, transferred onto the recording medium by said transfer means, on the recording medium;

laser beam emitting means, arranged between said process cartridge mounted onto said mounting means and said fixing means to be located within a height of said process cartridge mounted onto said mounting means in a vertical direction, for emitting a laser beam in accordance with image information;

a feed cassette for storing the recording medium;

recording medium receiving means for receiving a recording medium on which an image has been formed; and convey means for guiding a recording medium fed from said feed cassette to a position between said electrophotographic photosensitive member and said transfer means by reversing a path travelled by the recording medium, and guiding the recording medium, on which a toner image has been transferred from said electrophotographic photosensitive member and which has passed through said fixing means, to said recording medium receiving means by reversing the path travelled by the recording medium again, wherein said recording medium receiving means receives a recording medium discharged from an apparatus main body while a leading end of the recording medium is laid substantially horizontally and a trailing end of the recording medium is inclined.

64. An image forming apparatus according to claim 63, further comprising recording medium receiving means arranged on an upper surface of an apparatus main body so as to be inclined obliquely upward in the same direction as a direction in which said laser beam emitting means emits the laser beam.

65. An image forming apparatus according to claim 64, wherein a recording medium on which an image is formed is discharged in the same direction as a direction in which the laser beam emitted from said laser beam emitting means propagates, and is received by said recording medium receiving means.

66. An image forming apparatus according to claim 64, wherein said laser beam emitting means is arranged such that a laser beam emission hole is directed obliquely upward.

67. An image forming apparatus according to claim 63, wherein said laser beam emitting means is a laser scanner unit incorporating a laser diode for emitting a laser beam in accordance with the image information, a polygon mirror, and an imaging lens.

68. An image forming apparatus according to claim 63, wherein said laser beam emitting means is arranged within a height of said process cartridge in a vertical direction.

69. An image forming apparatus according to claim 63, wherein said laser beam emitting means is arranged between said process cartridge and fixing means for fixing an image on the recording medium so as not to overlap said process cartridge and said fixing means in a vertical direction.

70. An image forming apparatus according to claim 63, further comprising a feed cassette for storing the recording medium, said feed cassette arranged below said process cartridge, said laser beam emitting means, and said fixing means to extend therealong.

71. An image forming apparatus according to claim 64, further comprising a feed cassette for storing the recording medium, wherein the recording medium is fed from said feed cassette and reaches said image forming means after a path travelled by the recording medium is reversed, and the recording medium reaches said recording medium receiving means while the recording medium is reversed again after an image forming operation.

72. An image forming apparatus according to claim 63, further comprising a convey guide extending from said photosensitive member to said fixing means, wherein said laser beam emitting means is arranged above said convey guide.

73. An image forming apparatus according to claim 63, further comprising an electric circuit board arranged below said laser beam emitting means.

74. An image forming apparatus according to claim 63, wherein said image forming apparatus is a laser beam printer.

75. An image forming apparatus according to claim 63, wherein said image forming apparatus is an electrophotographic copying machine.

76. An image forming apparatus according to claim 63, wherein said image forming apparatus is a facsimile apparatus.

77. An image forming apparatus according to claim 63, wherein said process cartridge mounted in said mounting means, said laser beam emitting means, and said fixing means are arranged so as not to overlap each other in a vertical direction.

78. An image forming apparatus according to claim 64, wherein a recording medium on which an image is formed is discharged in the same direction as a direction in which the laser beam emitted from said laser beam emitting means propagates, and is received by said recording medium receiving means.

79. An image forming apparatus according to claim 63, wherein said transfer means includes a transfer roller.

80. An image forming apparatus according to claim 63, wherein said fixing means includes a ceramic heater, a heat-resistant film, and a pressure roller for pressing the recording medium against said ceramic heater through said heat-resistant film.

81. An image forming apparatus according to claim 63, wherein said process cartridge is formed by integrating said electrophotographic photosensitive member as an image bearing member and charging means for charging said photosensitive member, developing means for developing a latent image formed on said photosensitive member, or cleaning means for removing a residual toner on said photosensitive member as said process means into a cartridge, said cartridge being designed to be detachable from an image forming apparatus main body.

82. An image forming apparatus according to claim 63, wherein said process cartridge is formed by integrating an electrophotographic photosensitive member as said image bearing member and at least one of charging means for charging said photosensitive member, developing means for developing a latent image formed on said photosensitive member, and cleaning means for removing a residual toner on said photosensitive member as said process means into a cartridge, said cartridge being designed to be detachable from an image forming apparatus main body.

83. An image forming apparatus according to claim 63, wherein said process cartridge is formed by integrating at least developing means for developing a latent image formed on said photosensitive member and said electrophotographic photosensitive member into a cartridge, said cartridge being designed to be detachable from an image forming apparatus main body.

84. An image forming apparatus for forming an image on a recording medium, said apparatus comprising:

mounting means for removably mounting a process cartridge, said process cartridge including an electrophotographic photosensitive member and process means acting on said electrophotographic photosensitive member;

transfer means for transferring a toner image, formed on said electrophotographic photosensitive member included in said process cartridge, onto the recording medium;

fixing means for fixing the toner image, transferred onto the recording medium by said transfer means, on the recording medium;

laser beam emitting means, arranged between said process cartridge mounted onto said mounting means and said fixing means to be located within a height of said process cartridge mounted onto said mounting means in a vertical direction, for emitting a laser beam in accordance with image information;

a feed cassette for storing the recording medium;

recording medium receiving means for receiving a recording medium on which an image has been formed; and convey means for guiding a recording medium fed from said feed cassette to a position between said electrophotographic photosensitive member and said transfer means by reversing a path travelled by the recording medium, and guiding the recording medium, on which a toner image has been transferred from said electrophotographic photosensitive member and which has passed through said fixing means, to the recording medium receiving means by reversing the path travelled by the recording medium again, wherein said mounting means, said laser beam emitting means, and said fixing means are arranged so as to not overlap each other in a vertical direction.

85. An image forming apparatus according to claim 84, further comprising recording medium receiving means arranged on an upper surface of an apparatus main body so as to be inclined obliquely upward in the same direction as a direction in which said laser beam emitting means emits the laser beam.

86. An image forming apparatus according to claim 84, wherein a recording medium on which an image is formed is discharged in the same direction as a direction in which the laser beam emitted from said laser beam emitting means propagates, and is received by said recording medium receiving means.

87. An image forming apparatus according to claim 85, wherein said laser beam emitting means is arranged such that a laser beam emission hole is directed obliquely upward.

88. An image forming apparatus according to claim 84, wherein said laser beam emitting means is a laser scanner unit incorporating a laser diode for emitting a laser beam in accordance with the image information, a polygon mirror, and an imaging lens.

89. An image forming apparatus according to claim 84, wherein said laser beam emitting means is arranged within a height of said process cartridge in a vertical direction.

90. An image forming apparatus according to claim 84, wherein said laser beam emitting means is arranged between said process cartridge and fixing means for fixing an image on the recording medium so as not to overlap said process cartridge and said fixing means in a vertical direction.

91. An image forming apparatus according to claim 84, further comprising a feed cassette for storing the recording medium, said feed cassette arranged below said process cartridge, said laser beam emitting means, and said fixing means to extend therealong.

92. An image forming apparatus according to claim 84, further comprising a feed cassette for storing the recording medium, wherein the recording medium is fed from said feed cassette and reaches said image forming means after a path travelled by the recording medium is reversed, and the recording medium reaches said recording medium receiving means while the recording medium is reversed again after an image forming operation.

93. An image forming apparatus according to claim 84, further comprising a convey guide extending from said photosensitive member to said fixing means, wherein said laser beam emitting means is arranged above said convey guide.

94. An image forming apparatus according to claim 84, further comprising an electric circuit board arranged below said laser beam emitting means.

95. An image forming apparatus according to claim 84, wherein said image forming apparatus is a laser beam printer.

96. An image forming apparatus according to claim 84, wherein said image forming apparatus is an electrophotographic copying machine.

97. An image forming apparatus according to claim 84, wherein said image forming apparatus is a facsimile apparatus.

98. An image forming apparatus according to claim 84, wherein said process cartridge mounted in said mounting means, said laser beam emitting means, and said fixing means are arranged so as not to overlap each other in a vertical direction.

99. An image forming apparatus according to claim 84, wherein a recording medium on which an image is formed is discharged in the same direction as a direction in which the laser beam emitted from said laser beam emitting means propagates, and is received by said recording medium receiving means.

100. An image forming apparatus according to claim 84, wherein said transfer means includes a transfer roller.

101. An image forming apparatus according to claim 84, wherein said fixing means includes a ceramic heater, a heat-resistant film, and a pressure roller for pressing the recording medium against said ceramic heater through said heat-resistant film.

102. An image forming apparatus according to claim 84, wherein said process cartridge is formed by integrating said electrophotographic photosensitive member as an image bearing member and charging means for charging said photosensitive member, developing means for developing a latent image formed on said photosensitive member, or cleaning means for removing a residual toner on said photosensitive member as said process means into a cartridge, said cartridge being designed to be detachable from an image forming apparatus main body.

103. An image forming apparatus according to claim 84, wherein said process cartridge is formed by integrating said electrophotographic photosensitive member as an image bearing member and at least one of charging means for charging said photosensitive member, developing means for developing a latent image formed on said photosensitive member, and cleaning means for removing a residual toner on said photosensitive member as said process means into a cartridge, said cartridge being designed to be detachable from an image forming apparatus main body.

104. An image forming apparatus according to claim 84, wherein said process cartridge is formed by integrating at least developing means for developing a latent image formed on said photosensitive member and said electrophotographic photosensitive member into a cartridge, said cartridge being designed to be detachable from an image forming apparatus main body.

105. An image forming apparatus for forming an image on a recording medium, said apparatus comprising:

a mounting mechanism for removably mounting a process cartridge, said process cartridge including an electrophotographic photosensitive member and process means acting on said electrophotographic photosensitive member;

a transfer device for transferring a toner image, formed on said electrophotographic photosensitive member, onto the recording medium;

a fixing device for fixing the toner image, transferred onto the recording medium by said transfer device, on the recording medium;

a laser beam emitter, arranged between said process cartridge mounted onto said mounting mechanism and said fixing device to be located within a height of said process cartridge mounted onto said mounting mechanism in a vertical direction, for emitting a laser beam in accordance with image information;

a feed cassette for storing the recording medium;

a recording medium receiver for receiving a recording medium on which an image has been formed; and a conveying mechanism for guiding a recording medium fed from said feed cassette to a position between said electrophotographic photosensitive member and said transfer device by reversing a path travelled by the recording medium, and guiding the recording medium, on which a toner image has been transferred from said electrophotographic photosensitive member and which has passed through said fixing device, to the recording medium receiver by reversing the path of the recording medium again, wherein said recording medium receiver receives a recording medium discharged from an apparatus main body while a leading end of the recording medium is laid substantially horizontally and a trailing end of the recording medium is inclined, and wherein said mounting mechanism, said laser beam emitter, and said fixing device are arranged so as to not overlap each other in a vertical direction.

106. An image forming apparatus according to claim 105, further comprising a recording medium receiver arranged on an upper surface of an apparatus main body so as to be inclined obliquely upward in the same direction as a direction in which said laser beam emitter emits the laser beam.

107. An image forming apparatus according to claim 105, wherein a recording medium on which an image is formed is discharged in the same direction as a direction in which the laser beam emitted from said laser beam emitter propagates, and is received by said recording medium receiver.

108. An image forming apparatus according to claim 105, wherein said laser beam emitter is arranged such that a laser beam emission hole is directed obliquely upward.

109. An image forming apparatus according to claim 105, wherein said laser beam emitter includes a laser scanner unit incorporating a laser diode for emitting a laser beam in accordance with the image information, a polygon mirror, and an imaging lens.

110. An image forming apparatus according to claim 105, wherein said laser beam emitter is arranged within a height of said process cartridge in a vertical direction.

111. An image forming apparatus according to claim 105, wherein said laser beam emitter is arranged between said process cartridge and said fixing device for fixing an image on the recording medium so as not to overlap said process cartridge and said fixing device in a vertical direction.

112. An image forming apparatus according to claim 105, further comprising a feed cassette for storing the recording medium, said feed cassette arranged below said process cartridge, said laser beam emitter, and said fixing device to extend therealong.

113. An image forming apparatus according to claim 105, further comprising a feed cassette for storing the recording medium, wherein the recording medium is fed from said feed cassette and reaches said photosensitive member after a path travelled by the recording medium is reversed, and the recording medium reaches said recording medium receiving means while the recording medium is reversed again after an image forming operation.

114. An image forming apparatus according to claim 105, further comprising a convey guide extending from said photosensitive member to said fixing device, wherein said laser beam emitter is arranged above said convey guide.

115. An image forming apparatus according to claim 105, further comprising an electric circuit board arranged below said laser beam emitter.

116. An image forming apparatus according to claim 105, wherein said image forming apparatus is a laser beam printer.

117. An image forming apparatus according to claim 105, wherein said image forming apparatus is an electrophotographic copying machine.

118. An image forming apparatus according to claim 105, wherein said image forming apparatus is a facsimile apparatus.

119. An image forming apparatus according to claim 105, wherein said process cartridge mounted in said mounting mechanism, said laser beam emitter, and said fixing device are arranged so as not to overlap each other in a vertical direction.

120. An image forming apparatus according to claim 105, wherein a recording medium on which an image is formed is discharged in the same direction as a direction in which the laser beam emitted from said laser beam emitter propagates, and is received by said recording medium receiver.

121. An image forming apparatus according to claim 105, wherein said transfer means includes a transfer roller.

122. An image forming apparatus according to claim 105, wherein said fixing device includes a ceramic heater, a heat-resistant film, and a pressure roller for pressing the recording medium against said ceramic heater through said heat-resistant film.

* * * * *

UNITED STATES PATENT AND TRADEMARK OFFICE
CERTIFICATE OF CORRECTION

PATENT NO. : 5,621,451
DATED : April 15, 1997
INVENTOR(S) : Yoshinori SUGUIRA, et al.

It is certified that error appears in the above-indentified patent and that said Letters Patent is hereby corrected as shown below:

COLUMN 1, line 7, delete "fin" and insert therefor --In--.

COLUMN 9, line 66, delete "82" and insert therefor --S2--.

COLUMN 10, line 41, after "roller", insert --3c.--

COLUMN 19, line 41, after "beam", insert a comma (",").

COLUMN 20, line 3, after "means", delete the colon (":") and insert therefor a comma (",").

COLUMN 21, line 41, after "image", insert a comma (",").

COLUMN 22, line 29, delete the hyphen ("-") between "forming" and "apparatus".

COLUMN 23, line 38, delete "directions" and insert therefor --direction--.

UNITED STATES PATENT AND TRADEMARK OFFICE
CERTIFICATE OF CORRECTION

PATENT NO. : 5,621,451
DATED : April 15, 1997
INVENTOR(S) : Yoshinori SUGUIRA, et al.

It is certified that error appears in the above-indentified patent and that said Letters Patent is hereby corrected as shown below:

COLUMN 25, line 1, delete "44" and insert therefor --42--.

Signed and Sealed this

Fourth Day of November, 1997

*Attest:*

BRUCE LEHMAN

*Attesting Officer*     *Commissioner of Patents and Trademarks*